(12) United States Patent
Liang

(10) Patent No.: US 12,245,326 B2
(45) Date of Patent: Mar. 4, 2025

(54) MESSAGE TRANSMISSION METHOD AND TERMINAL

(71) Applicant: VIVO MOBILE COMMUNICATION CO.,LTD., Guangdong (CN)

(72) Inventor: Jing Liang, Guangdong (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 362 days.

(21) Appl. No.: 17/686,567

(22) Filed: Mar. 4, 2022

(65) Prior Publication Data

US 2022/0191676 A1   Jun. 16, 2022

Related U.S. Application Data

(63) Continuation of application No. PCT/CN2020/113551, filed on Sep. 4, 2020.

(30) Foreign Application Priority Data

Sep. 6, 2019  (CN) .......................... 201910843890.5

(51) Int. Cl.
*H04W 8/00* (2009.01)
*H04W 4/90* (2018.01)
(Continued)

(52) U.S. Cl.
CPC ............. *H04W 8/005* (2013.01); *H04W 4/90* (2018.02); *H04W 76/20* (2018.02); *H04W 80/02* (2013.01); *H04W 92/18* (2013.01)

(58) Field of Classification Search
None
See application file for complete search history.

(56) References Cited

U.S. PATENT DOCUMENTS

2016/0029429 A1   1/2016 Peng et al.
2016/0088624 A1   3/2016 Lee et al.
(Continued)

FOREIGN PATENT DOCUMENTS

CN   104066126 A   9/2014
CN   106575995 A   4/2017
(Continued)

OTHER PUBLICATIONS

Huawei, "Summary of [96#59][LTE/V2X] on Uu/SL prioritization", 3GPP TSG-RAN WG2 Meeting #97, R2-1701375, Athens, Greece, Feb. 13-17, 2017.
(Continued)

*Primary Examiner* — Jamaal Henson
(74) *Attorney, Agent, or Firm* — Price Heneveld LLP

(57) ABSTRACT

A message transmission method and a terminal are disclosed. The method includes: transmitting a first discovery (discovery) message in a sidelink (SL), where the first discovery message is transparently transmitted between an upper layer and a MAC layer, and a priority of the first discovery message is determined based on whether the first discovery message is used for public safety; or the first discovery message is transmitted between an upper layer and a MAC layer through a logical channel, and a priority of the first discovery message is determined based on the logical channel and/or a corresponding bearer.

12 Claims, 3 Drawing Sheets

(51) Int. Cl.
H04W 76/20 (2018.01)
*H04W 80/02* (2009.01)
*H04W 92/18* (2009.01)

(56) References Cited

U.S. PATENT DOCUMENTS

| | | | |
|---|---|---|---|
| 2017/0367087 A1* | 12/2017 | Seo | H04W 72/51 |
| 2018/0027488 A1 | 1/2018 | Wu et al. | |
| 2018/0035276 A1* | 2/2018 | Kang | H04W 72/02 |
| 2018/0077746 A1 | 3/2018 | Lee et al. | |
| 2018/0092112 A1 | 3/2018 | Jung et al. | |
| 2020/0045724 A1 | 2/2020 | Lu et al. | |
| 2020/0059944 A1* | 2/2020 | Lee | H04W 4/40 |
| 2021/0058820 A1* | 2/2021 | Lee | H04W 28/0268 |

FOREIGN PATENT DOCUMENTS

| | | |
|---|---|---|
| CN | 106664693 A | 5/2017 |
| CN | 107409349 A | 11/2017 |
| CN | 109891987 A | 6/2019 |
| CN | 110536354 A | 12/2019 |
| EP | 3747225 A1 | 12/2020 |
| WO | 2017049432 A1 | 3/2017 |
| WO | 2018074874 A1 | 4/2018 |
| WO | 2019033407 A1 | 2/2019 |
| WO | 2019216617 A1 | 11/2019 |

OTHER PUBLICATIONS

LG Electronics, "UL and SL prioritization", 3GPP TSG-RAN WG2 #103bis, R2-1815561, Chengdu, China, Oct. 8-12, 2018.

Oppo, "Summary of [106#77] UL/SL prioritization", 3GPP TSG-RAN WG2 Meeting #107, R2-1908717, Prague, Czech, Aug. 26-Aug. 30, 2019.

LG Electronics Inc., UL and SL prioritization, 3GPP TSG RAN WG2 #10 3 bis, R2 1815417, Oct. 8-12, 2018, Chengdu, China.

* cited by examiner

MESSAGE TRANSMISSION METHOD AND TERMINAL

CROSS-REFERENCE TO RELATED APPLICATIONS

This application is a continuation application of PCT International Application No. PCT/CN2020/113551 filed on Sep. 4, 2020, which claims priority to Chinese Patent Application No. 201910843890.5, filed in China on Sep. 6, 2019, both of which are incorporated herein by reference in their entireties.

TECHNICAL FIELD

This disclosure relates to the field of communications technologies, and in particular, to a message transmission method and a terminal.

BACKGROUND

Currently, a communications system supports sidelink (SL, or translated into side link or direct link) communication, and data transmission can be directly performed between terminals in sidelink communication. In addition, some communications systems plan to introduce a discovery message. The discovery message may be used to discover a device. For example, a discovering terminal discovers a nearby terminal that can be directly connected. However, some related arts only plan to introduce the discovery message, but still cannot implement discovery message transmission. Therefore, a terminal discovery effect is relatively poor.

SUMMARY

Embodiments of this disclosure provide a message transmission method and a terminal, to resolve a problem that a terminal discovery effect is relatively poor.

According to a first aspect, an embodiment of this disclosure provides a message transmission method, applied to a terminal and including:

transmitting a first discovery message in an SL, where
the first discovery message is transparently transmitted between an upper layer and a media access control (MAC) layer, and a priority of the first discovery message is determined based on whether the first discovery message is used for public safety; or
the first discovery message is transmitted between an upper layer and a MAC layer through a logical channel, and a priority of the first discovery message is determined based on the logical channel and/or a corresponding bearer.

According to a second aspect, an embodiment of this disclosure provides a message transmission method, applied to a terminal and including:

determining a priority of a UL message and a priority of an SL message based on a first threshold and a second threshold; and
performing transmission processing on the UL message and the SL message based on the priority of the UL message and the priority of the SL message.

According to a third aspect, an embodiment of this disclosure provides a terminal, including:

a transmission module, configured to transmit a first discovery message in an SL, where
the first discovery message is transparently transmitted between an upper layer and a MAC layer, and a priority of the first discovery message is determined based on whether the first discovery message is used for public safety; or
the first discovery message is transmitted between an upper layer and a MAC layer through a logical channel, and a priority of the first discovery message is determined based on the logical channel and/or a corresponding bearer.

According to a fourth aspect, an embodiment of this disclosure provides a terminal, including:

a determining module, configured to determine a priority of a UL message and a priority of an SL message based on a first threshold and a second threshold; and
a processing module, configured to perform transmission processing on the UL message and the SL message based on the priority of the UL message and the priority of the SL message.

According to a fifth aspect, an embodiment of this disclosure provides a terminal, including a memory, a processor, and a program stored in the memory and capable of running on the processor, where when the program is executed by the processor, steps of the message transmission method according to the first aspect are implemented, or when the program is executed by the processor, steps of the message transmission method according to the second aspect are implemented.

According to a sixth aspect, an embodiment of this disclosure provides a computer-readable storage medium, where the computer-readable storage medium stores a computer program, and when the computer program is executed by a processor, steps of the message transmission method according to the first aspect are implemented, or when the computer program is executed by a processor, steps of the message transmission method according to the second aspect are implemented.

In the embodiments of this disclosure, the first discovery message in the SL is transmitted, where the first discovery message is transparently transmitted between the upper layer and the MAC layer, and the priority of the first discovery message is determined based on whether the first discovery message is used for public safety; or the first discovery message is transmitted between the upper layer and the MAC layer through the logical channel, and the priority of the first discovery message is determined based on the logical channel and/or the corresponding bearer. Because the discovery message is supported, a terminal discovery effect is improved.

DETAILED DESCRIPTION OF EMBODIMENTS

The following clearly describes the technical solutions in the embodiments of this disclosure with reference to the accompanying drawings in the embodiments of this disclosure. Apparently, the described embodiments are some but not all of the embodiments of this disclosure. All other embodiments obtained by a person of ordinary skill in the art based on the embodiments of this disclosure without creative efforts shall fall within the protection scope of this disclosure.

In the specification and claims of this application, the term "include" and any other variants thereof are intended to cover the non-exclusive inclusion, for example, a process, method, system, product, or device that includes a list of steps or units is not necessarily limited to those expressly listed steps or units, but may include other steps or units not expressly listed or inherent to such a process, method, system, product, or device. In addition, in the specification and claims, use of "and/or" represents presence of at least one of the connected objects, for example, "A and/or B" indicates the following three cases: A alone, B alone, or both A and B.

In the embodiments of this disclosure, words such as "an example" or "for example" are used to represent an example, an instance, or an illustration. Any embodiment or design solution described as "an example" or "for example" in the embodiments of this disclosure shall not be interpreted to be more optional or advantageous than other embodiments or design solutions. To be precise, the words such as "an example" or "for example" are intended to present a related concept in a specific manner.

The following describes the embodiments of this disclosure with reference to the accompanying drawings. A message transmission method and a terminal provided in the embodiments of this disclosure may be applied to a wireless communications system. The wireless communications system may be a 5G system, an evolved long term evolution (eLTE) system, a long term evolution (LTE), a later evolved communications system, or the like.

Figure 1:
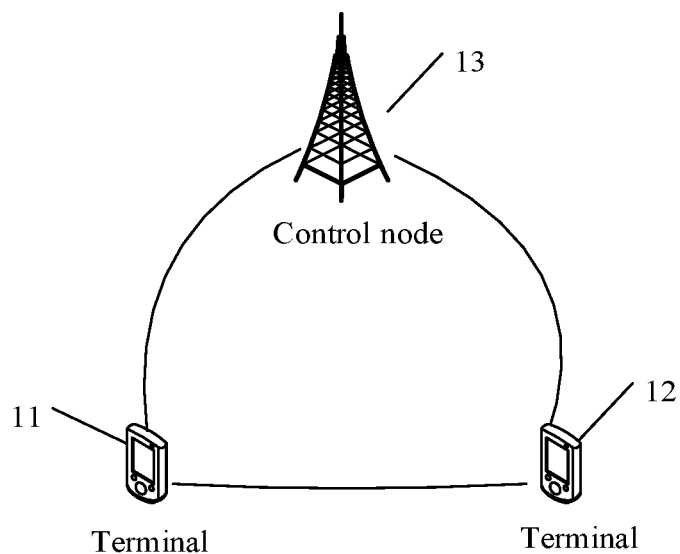
FIG. 1 is a structural diagram of a network system to which an embodiment of this disclosure may be applied.

FIG. 1 is a structural diagram of a network system to which an embodiment of this disclosure may be applied. As shown in FIG. 1, the network system includes a terminal 11, a terminal 12, and a control node 13. Communication may be performed between the terminal 11 and the terminal 12 through a PC5 interface by using a sidelink (SL). Communication may be performed between the control node 13 and the terminals (including the terminal 11 and the terminal 12) through an air interface (Uu interface) by using an uplink and a downlink. The terminal 11 and the terminal 12 may be user terminals (User Equipment, UE) or other terminal-side devices, for example, terminal-side devices such as mobile phones, tablet computers (Tablet Personal Computer), laptop computers, personal digital assistants (PDA), mobile Internet devices (MID), wearable devices, intelligent vehicles, vehicle-mounted devices, or robots. It should be noted that specific types of the terminals are not limited in this embodiment of this disclosure. The control node 13 may be a network device, for example, a 4G base station, or a 5G base station, or a base station of a later version, or a base station in another communications system, or is referred to as a NodeB, or an evolved NodeB, or a transmission and reception point (TRP), or an access point (AP), or other terms in the art. As long as a same technical effect is achieved, the network device is not limited to a specific technical term. Alternatively, the control node 13 may be some integrated access backhaul nodes (IAB), or may be some sidelink terminals, relays (relay), or roadside units (RSU), or certainly may be some other network facilities like RSUs or IABs.

Figure 2:
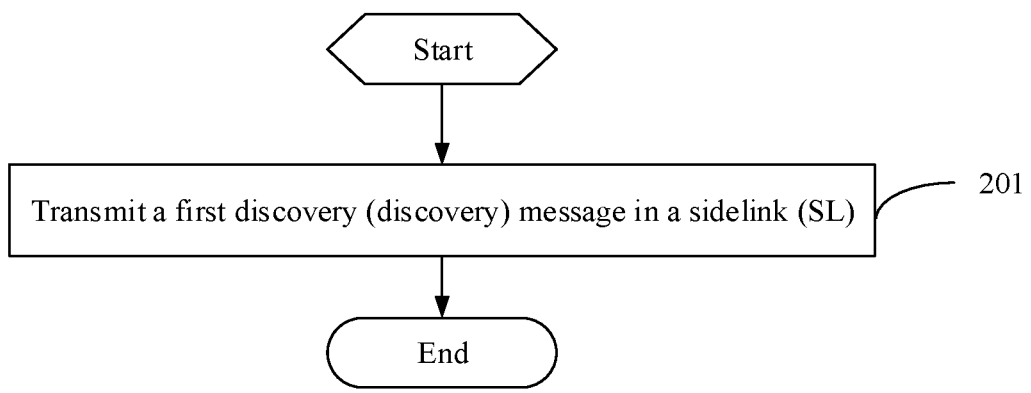
FIG. 2 is a flowchart of a message transmission method according to an embodiment of this disclosure.

FIG. 2 is a flowchart of a message transmission method according to an embodiment of this disclosure. The method is applied to a terminal. As shown in FIG. 2, the method includes the following steps.

Step 201: Transmit a first discovery message in an SL.

The first discovery message is transparently transmitted between an upper layer and a MAC layer, and a priority of the first discovery message is determined based on whether the first discovery message is used for public safety; or the first discovery message is transmitted between an upper layer and a MAC layer through a logical channel, and a priority of the first discovery message is determined based on the logical channel and/or a corresponding bearer.

The transmitting a first discovery message in an SL may be sending the first discovery message in the SL, or may be receiving the first discovery message in the SL.

In addition, the first discovery message may be a discovery message sent by a discovering terminal, or a discovery message sent by a discovered terminal, for example, a request for discovery, which means that a terminal sending the message requests to discover another device by using the message, or active (such as broadcast) discovery, which means that a terminal sending the message actively informs another device.

In addition, the first discovery message may be a discovery related message, or may be messages related to various types of discovery for a plurality of purposes, for example, related messages used for group discovery in network controlled interactive services (NCIS) or related services, used for group discovery in other services, used for relay discovery (including a terminal-to-network relay and a terminal-to-terminal relay), or used for terminal discovery. Specifically, the first discovery message may be a discovery related message defined in a communications protocol, or a discovery related message newly defined in a subsequent protocol version.

That the first discovery message is transparently transmitted between an upper layer and a MAC layer may be: the first discovery message is transparently transmitted from the upper layer to the MAC layer, or the first discovery message is transparently transmitted from the MAC layer to the upper layer. In other words, an access stratum (AS) protocol stack includes only a MAC layer and a physical layer, and there is no corresponding logical channel for the first discovery message. In this case, the priority of the first discovery message is determined based on whether the first discovery message is used for public safety. For example, a priority of a discovery message used for public safety is higher than a priority of a discovery message used for non-public safety.

That the first discovery message is transmitted between an upper layer and a MAC layer through a logical channel may be: the first discovery message is transmitted from the upper layer to the MAC layer through the logical channel, or the first discovery message is transmitted from the MAC layer to the upper layer through the logical channel. In other words, in addition to the MAC layer and the physical layer, the AS protocol stack may further include a packet data convergence protocol (PDCP) layer and a radio link control (RLC) layer. The logical channel may be a data logical channel, where the data logical channel may include a sidelink traffic channel (STCH); or the logical channel may be a signaling logical channel, where the signaling logical channel may include a sidelink control channel (SCCH). In this case, the priority of the first discovery message is determined based on the logical channel and/or the corresponding bearer. For example, the priority of the first discovery message follows the logical channel or the corresponding bearer, or the priority of the first discovery message is determined by the logical channel and the corresponding bearer. For example, when a priority of the logical channel and a priority of the corresponding bearer are inconsistent, one of the priorities is selected as the priority of the first discovery message. In addition, the corresponding bearer may be a bearer for transmitting the discovery message.

In addition, after the first discovery message is transmitted to the MAC layer, the first discovery message may be transmitted through a physical channel; or after the first discovery message is received from a physical channel, the first discovery message is transmitted to the MAC layer.

In this embodiment of this disclosure, the foregoing step can implement transmission of the discovery message, so that the terminal can perform discovery, to improve a terminal discovery effect. In addition, the transmitting a first discovery message in an SL may be performing transmission based on the priority of the first discovery message.

In an optional implementation, in a case that the first discovery message is transparently transmitted between the upper layer and the MAC layer, the priority of the first discovery message is determined based on the following:

- a first message in an uplink (UL) has a first priority, a first message in the SL has a second priority, a second message in the UL and a second message in the SL have a third priority, the first priority is higher than or equal to the second priority, and the second priority is higher than the third priority, where
- a priority of a discovery message used for public safety is higher than or equal to the second priority, or higher than the third priority, or lower than the third priority;
- a priority of a discovery message used for non-public safety is higher than the third priority, or lower than the third priority; and
- the priority of the discovery message used for public safety is higher than the priority of the discovery message used for non-public safety.

It should be noted that, that the priority of the discovery message used for public safety is higher than the priority of the discovery message used for non-public safety may be that the priority of the discovery message used for public safety is always higher than the priority of the discovery message used for non-public safety. For example, in a case that the priority of the discovery message used for public safety is lower than the third priority, and the priority of the discovery message used for non-public safety is lower than the third priority, the priority of the discovery message used for non-public safety is lower than the priority of the discovery message used for public safety. If the priority of the discovery message used for non-public safety is a fifth priority, and the priority of the discovery message used for public safety is a fourth priority, the fourth priority is higher than the fifth priority.

That the priority of the discovery message used for public safety is higher than or equal to the second priority may be that the priority of the discovery message used for public safety is lower than or equal to the first priority but higher than or equal to the second priority. That the priority of the discovery message used for public safety is higher than the third priority may be that the priority of the discovery message used for public safety is lower than or equal to the second priority but higher than the third priority.

The priority of the discovery message used for non-public safety being higher than the third priority may be lower than or equal to the second priority but higher than the third priority.

Based on definitions of the priorities, the terminal can send or receive important messages preferentially, so that overall performance of a communications system is better.

For example, the first discovery message is transparently transmitted to the MAC layer, and after resource scheduling is performed at the MAC layer, the first discovery message is transmitted through the physical channel, for example, a physical sidelink discovery channel (PSDCH). In this case, a priority order of the discovery message and other messages may be directly configured by a network or specified in a protocol. Without considering a discovery gap (SL discovery gap), a possible order is as follows:

- first priority: RACH random access transmission on a Uu interface and emergency PDU connection related transmission;
- second priority: non-RACH related data transmission on the Uu interface, and related data transmission on an SL PC5 interface (based on comprehensive consideration of QoS of the two); and
- third priority: discovery related message transmission on the SL PC5 interface.

Optionally, in a case that a discovery gap is configured for the SL, the priorities of the discovery message used for public safety and the discovery message used for non-public safety within the discovery gap are higher than the third priority.

The discovery gap may be an interval for sending and receiving discovery messages.

That the priorities of the discovery message used for public safety and the discovery message used for non-public safety within the discovery gap are higher than the third priority may be that the priority of the discovery message used for public safety is higher than the third priority but lower than the first priority or the second priority, or certainly may be that a priority is the highest within the gap, and the discovery message used for non-public safety is higher than the third priority but lower than the first priority or the second priority.

In this implementation, the discovery message can be preferentially transmitted within the discovery gap.

Optionally, the first discovery message includes indication information, and the indication information is used to indicate that the first discovery message is a discovery message used for public safety or a discovery message used for non-public safety or commerce.

The indication information may be understood as being used to indicate the type of the first discovery message, for example, indicate that the first discovery message is used for public safety, or indicate that the first discovery message is used for non-public safety or commerce, where the discovery message used for commerce may also be a discovery message used for non-public safety. In other words, for the discovery message used for non-public safety, the indication information may indicate that the discovery message is used for non-public safety or commerce (commercial).

Further, the indication information may also be used to indicate discovery content of the first discovery message.

The discovery content may indicate that the discovery message is used for group discovery in NCIS or related services, used for group discovery in other services, used for relay discovery (including a terminal-to-network relay and a terminal-to-terminal relay), used for terminal discovery, or the like.

In this implementation, the type and discovery content of the first discovery message may be indicated by the indication information, so that the terminal can accurately determine the priority of the first discovery message.

Optionally, the first message in the UL includes at least one of a random access message in the UL, an emergency communication message in the UL, and a first service message in the UL, and the second message in the UL is a message in the UL other than the first message in the UL.

The random access message may be a random access message of a random access channel (RACH), for example, a msg 1 or a msg 3 (or a msg A). The emergency communication message may be an emergency communication message defined in a protocol such as an emergency protocol data unit (PDU).

The first service message may be messages of some special services, for example, a message of a service such as Ultra Reliable Low Latency Communications (URLLC), and the service may be specifically a predefined service.

The second message in the UL may be a service message other than the first service message, for example, a second service message. The second service message may be an enhanced mobile broadband (eMBB) related message, or a massive machine type communication (mMTC) related message, or the like. Further, the second message in the UL may be data in the UL.

It should be noted that the message in this embodiment of this disclosure may be data or signaling. In addition, the priority of the message may be a transmission priority of the message.

Optionally, the first message in the SL includes radio resource control (RRC) signaling in the SL, and the second message in the SL includes at least one of data in the SL and a PC5 signaling message (PC5-S message) in the SL; or the first message in the SL includes at least one of RRC signaling in the SL and a PC5 signaling message in the SL, and the second message in the SL includes data in the SL.

The RRC signaling may be RRC related signaling.

It should be noted that, in this embodiment of this disclosure, the message or data in the UL may also be referred to as a message or data on the Uu interface, and the message or data in the SL may also be referred to as a message or data on a PC5 interface.

Optionally, in a case that the first message in the SL includes the RRC signaling in the SL and the PC5 signaling message in the SL,
  the RRC signaling in the SL and the PC5 signaling message in the SL are transmitted through a same signaling radio bearer (SRB), and the RRC signaling in the SL and the PC5 signaling message in the SL have a same priority; or
  the RRC signaling in the SL and the PC5 signaling message in the SL are transmitted through different SRBs, where an SRB used for the PC5 signaling message in the SL is configured by using RRC signaling in the SL, and if establishment of the SRB used for the PC5 signaling message in the SL is completed, the PC5 signaling message in the SL is transmitted on the established SRB, and a priority of the RRC signaling in the SL is higher than a priority of the PC5 signaling message in the SL.

For example, if there is only one SRB (such as a default SRB) on the SL PC5 of the terminal, the RRC signaling in the SL and the PC5 signaling message in the SL have a same priority.

If there is more than one SRB, it may be considered that the RRC signaling in the SL and the PC5 signaling message in the SL are placed on different SRBs, where the priority of the RRC signaling in the SL is higher than the priority of the PC5 signaling message in the SL. In addition, if the SRB used for the PC5 signaling message in the SL is configured by using the RRC signaling in the SL, after establishment of the SRB specially used for the PC5 signaling message is completed, the PC5 signaling message is transmitted on the newly established SRB.

In this implementation, the terminal can transmit the PC5 signaling message in the SL and the RRC signaling in the SL based on the corresponding priority.

It should be noted that the RRC signaling in the SL for configuring the SRB used for the PC5 signaling message in the SL is not limited to the RRC signaling included in the first message in the SL, that is, may or may not be the RRC signaling included in the first message in the SL. In other words, the SRB that can be configured for the PC5 signaling message is not necessarily configured by using the RRC signaling included in the first message in the SL. There are a plurality of types of SL RRC signaling, and the RRC signaling transmitted on the SRB is not necessarily all used to configure the SRB.

Optionally, a plurality of messages with the third priority are transmitted on a data radio bearer (DRB);
  at least two of the plurality of messages with the third priority have different priorities; and
  when the plurality of messages with the third priority cannot be sent simultaneously, based on a priority order, messages with higher priorities are preferentially sent or some of the plurality of messages with the third priority are preferentially discarded.

The plurality of messages with the third priority may be the second message in the SL and the second message in the UL, for example, the data in the UL, the data in the SL, and the PC5 signaling message in the SL, where the data in the UL may be data in non-RACH random access transmission and emergency communication related transmission, which may specifically depend on quality of service (QoS) of the data.

Using the data in the UL, the data in the SL, and the PC5 signaling message in the SL as an example, because all of the three are transmitted on a data channel, the PC5 signaling message in the SL may be assigned a special logical channel identifier (LCID) or a QoS related parameter, where the QoS related parameter may include at least one of a quality of service flow ID (QoS Flow ID, QFI), a quality of service flow ID (PC5 QoS flow ID, PFI) used for PC5, and a QoS identifier (PC5 QoS identifier, PQI) used for PC5. The PQI may also be referred to as a VQI (V2X QoS flow ID). In this way, when the terminal cannot send the three simultaneously, based on the priority order, one with a higher priority is preferentially transmitted, or one or two with a lower priority are preferentially discarded.

In this implementation, when the terminal transmits messages with the third priority, messages with higher priorities can be preferentially transmitted or some of the plurality of messages with the third priority are preferentially discarded, to improve transmission performance of the terminal.

Optionally, the priority of the second message in the UL is different from the priority of the second message in the SL; and
  if the priority (e.g. priority value) of the second message in the UL is lower than a first threshold, the second message in the UL is preferential; if the priority of the second message in the UL is not lower than the first threshold, and the priority of the second message in the SL is lower than a second threshold, the second message in the SL is preferential; or if the priority of the second message in the UL is not lower than the first threshold, and the priority of the second message in the SL is not lower than the second threshold, the second message in the UL is preferential;

or if the priority of the second message in the SL is lower than a first threshold, the second message in the SL is preferential; if the priority of the second message in the SL is not lower than the first threshold, and the priority of the second message in the UL is lower than a second threshold, the second message in the UL is preferential; or if the priority of the second message in the SL is not lower than the first threshold, and the priority of the second message in the UL is not lower than the second threshold, the second message in the SL is preferential;

or if the priority of the second message in the SL is lower than a first threshold, and the priority of the second message in the UL is not lower than a second threshold, the second message in the SL is preferential; or if the priority of the second message in the SL is not lower than a first threshold, and the priority of the second message in the UL is lower than a second threshold, the second message in the UL is preferential;

or if the priority of the second message in the SL is not lower than a first threshold, and the priority of the second message in the UL is lower than a second threshold, the second message in the UL is preferential; or if the priority of the second message in the SL is lower than a first threshold, and the priority of the second message in the UL is not lower than a second threshold, the second message in the SL is preferential;

or in a first case, the second message in the SL is preferential; in a second case, the second message in the UL is preferential; or in cases other than the first case and the second case, the priority of the second message in the SL and the priority of the second message in the UL are determined by the terminal, where the first case is: the priority of the second message in the SL is lower than a first threshold, and the priority of the second message in the UL is not lower than a second threshold, and the second case is: the priority of the second message in the SL is not lower than the first threshold, and the priority of the second message in the UL is lower than the second threshold.

"Being not higher than" means "being lower than or equal to".

The first threshold and the second threshold may be configured by a network side or preconfigured, and the first threshold may be greater than the second threshold, or the second threshold may be greater than the first threshold. In addition, in the foregoing implementation, the first threshold may be used for determining first, and then the second threshold is used for determining Certainly, in some implementations, the two thresholds may be both used for determining. For example, when the priority of the second message in the SL is lower than the first threshold, and the priority of the second message in the UL is lower than the second threshold, in an implementation in which the second message in the UL is preferential, the two thresholds may be both used for determining.

That the second message in the SL is preferential if the priority of the second message in the SL is lower than the first threshold and the priority of the second message in the UL is lower than the second threshold; or the second message in the UL is preferential if the priority of the second message in the SL is not lower than the first threshold and the priority of the second message in the UL is not lower than the second threshold, may be: if the priority of the second message in the SL is high enough and the priority of the second message in the UL is low enough, SL transmission is preferential; or if the priority of the second message in the SL is not high enough and the priority of the second message in the UL is not low enough, UL transmission is preferential.

That the second message in the UL is preferential if the priority of the second message in the SL is lower than the first threshold and the priority of the second message in the UL is lower than the second threshold; or the second message in the SL is preferential if the priority of the second message in the SL is not lower than the first threshold and the priority of the second message in the UL is not lower than the second threshold, may be: if the priority of the second message in the SL is low enough and the priority of the second message in the UL is high enough, UL transmission is preferential; or if the priority of the second message in the SL is not low enough and the priority of the second message in the UL is not high enough, SL transmission is preferential.

That the priority of the second message in the SL and the priority of the second message in the UL are determined by the terminal in cases other than the first case and the second case may be: if the priority of the second message in the SL is high enough and the priority of the second message in the UL is low enough, SL transmission is preferential, or if the priority of the second message in the SL is low enough and the priority of the second message in the UL is high enough, UL transmission is preferential, and the rest is left to the terminal for implementation, that is, decided by the terminal.

It should be noted that in this embodiment of this disclosure, the priority of each message may be a UL logical channel (LCH) priority, an SL LCH priority, a proximity service per packet priority (ProSe Per-Packet Priority, PPPP), a QoS identifier used for PC5 (PC5 QoS identifier, PQI), a QoS identifier used for 5G Uu (5G QoS identifier, 5QI), or a priority field in a PQI/5QI, which is configured by the network side or preconfigured.

In an optional implementation, in a case that the first discovery message is transmitted between the upper layer and the MAC layer through a control logical channel, the priority of the first discovery message is a priority of an SRB or the control logical channel that transmits the first discovery message.

The SRB may be transmitted on the control logical channel, and the control logical channel may transmit one or more SRBs. Even if the control logical channel has only one SRB, the priority of the first discovery message may be determined by a priority of the SRB, but the priority of the SRB may be determined by the control logical channel.

In this implementation, in a case that the first discovery message is transmitted through the control logical channel, the priority of the discovery message is the priority of the SRB or the control logical channel that transmits the first discovery message.

For example, the first discovery message is transmitted through the SCCH. In this case, a discovery related message, like RRC signaling in the SL (or referred to as a PC5-RRC message), is transmitted on the SCCH. In this case, the priority of the first discovery message follows the priority of the SCCH logical channel or the corresponding SRB. For example, because the SCCH is probably similar to a CCCH on the Uu interface, and transmits signaling messages and has the highest priority (for example, a priority 1), the first discovery message also has the highest priority accordingly. In addition, if there are SRBs with different priorities, it may be further considered that the first discovery message and the PC5-RRC message or the PC5 signaling message (PC5-S message) are placed on SRBs with different priorities (if the PC5-S message is also placed on an SRB for transmission), to achieve further prioritization.

A manner may be: in a case that the control logical channel includes SRBs with different priorities, the first discovery message and a message in the SL may be transmitted on SRBs with different priorities on the control logical channel, the priority of the first discovery message is the priority of the SRB that transmits the first discovery message, and the message in the SL includes at least one of the RRC signaling in the SL and the PC5 signaling message in the SL.

In this way, more appropriate prioritization can be achieved, so that transmission performance of the terminal is improved.

In an optional implementation, in a case that the first discovery message is transmitted between the upper layer and the MAC layer through a data logical channel,
  the first discovery message is assigned a QoS parameter, the first discovery message is mapped to the corresponding data logical channel by the terminal based on the QoS parameter, and the priority of the first discovery message is a priority of a DRB or the data logical channel that transmits the first discovery message; or
  the first discovery message is assigned an LCID, and the priority of the first discovery message is a priority of a logical channel corresponding to the LCID.

The QoS parameter may be a QoS related parameter, for example, at least one of the QFI, the PFI, the PQI, and the VQI. In addition, the QoS parameter may be configured by the terminal for the first discovery message, or is configured by the network or prescribed by a protocol.

For example, the first discovery message is assigned a QoS related parameter (QFI/PFI or PQI/VQI). The first discovery message is mapped to different logical channels by using a terminal-side QoS rule, and the priority of the first discovery message is compared with a priority of other data based on the priority of the logical channel. The parameters and mapping manner and the like in this implementation may be implemented based on a plurality of manners, for example, predefined or configured by the network.

The DRB may be transmitted on the data logical channel, and the data logical channel may transmit one or more DRBs. Even if the data logical channel has only one DRB, the priority of the first discovery message may be determined by a priority of the DRB, but the priority of the DRB may be determined by the control logical channel.

In addition, the priority of the logical channel corresponding to the LCID may also be understood as a priority of the LCID. In addition, the LCID may correspond to a specific type of priority, that is, the first discovery message is assigned the LCID, and the LCID corresponds to the special type of priority.

In addition, for the priority of the first discovery message, reference may also be made to priorities of other messages described in the foregoing implementation. Details are not described herein again.

In an optional implementation, in a case that the first discovery message is transmitted between the upper layer and the MAC layer through a control logical channel, the priority of the first discovery message is determined based on the following:
  a first message in a UL has a first priority, a first message and the first discovery message in the SL have a second priority, a second message in the UL and a second message in the SL have a third priority, the first priority is higher than or equal to the second priority, and the second priority is higher than the third priority;
or
  in a case that the first discovery message is transmitted between the upper layer and the MAC layer through a data logical channel, the priority of the first discovery message is determined based on the following:
  a first message in a UL has a first priority, a first message in the SL has a second priority, a second message in the UL and a second message and the first discovery message in the SL have a third priority, the first priority is higher than or equal to the second priority, and the second priority is higher than the third priority.

For the first message and the second message in the UL, reference may be made to descriptions in the foregoing implementation. Details are not described herein again.

In this implementation, a corresponding priority may be defined when transmission is implemented through the control logical channel and the data logical channel, to implement appropriate transmission.

In an implementation, that the first discovery message is transmitted between the upper layer and the MAC layer through a control logical channel may mean that the first discovery message is transmitted between the upper layer and the MAC layer through an SRB; and
  the first message in the SL includes RRC signaling in the SL and a PC5 signaling message in the SL, and the second message in the SL includes data in the SL; or the first message in the SL includes RRC signaling in the SL, and the second message in the SL includes data in the SL and a PC5 signaling message in the SL.

For the first message and the second message in the SL, reference may be made to descriptions in the foregoing implementation. Details are not described herein again.

Optionally, the first discovery message and the first message in the SL may be transmitted through a same SRB, and the priority of the first discovery message and the priority of the first message in the SL are the same; or
  the first discovery message and the first message in the SL may be transmitted on at least two SRBs, a priority of the RRC signaling in the SL is higher than or equal to the priority of the first discovery message, and the priority of the first discovery message is higher than or equal to a priority of the PC5 signaling message in the SL.

For example, if there is only one SRB (such as a default SRB) on the SL PC5, the RRC signaling in the SL, the PC5 signaling message in the SL, and the first discovery message have a same priority. If there is more than one SRB, it may be considered that the RRC signaling in the SL, the PC5 signaling message in the SL, and the first discovery message are placed on two or three different SRBs, where priorities are: RRC signaling≥first discovery message≥PC5 signaling message.

Optionally, the first discovery message is transmitted on a first SRB, the RRC signaling in the SL is transmitted on the first SRB or a second SRB, a third SRB used for the PC5 signaling message in the SL is configured by using RRC signaling in the SL, and if establishment of the third SRB is completed, the PC5 signaling message in the SL is transmitted on the third SRB, where
 a priority of the first SRB and a priority of the second SRB are the highest on the control logical channel, and a priority of the third SRB is lower than the priority of the first SRB and the priority of the second SRB.

It should be noted that the RRC signaling in the SL on the third SRB is not limited to the RRC signaling included in the first message in the SL, that is, may or may not be the RRC signaling included in the first message in the SL. In other words, the SRB that can be configured is not necessarily configured by using the RRC signaling included in the first message in the SL. There are a plurality of types of SL RRC signaling, and the RRC signaling transmitted on the SRB is not necessarily all used to configure the SRB.

For example, the first discovery related message is transmitted by using the default SRB with the highest priority, the RRC signaling is transmitted by using the default SRB or a dedicated SRB also with the highest priority, and the SRB used for the PC5 signaling message in the SL is configured by using PC5-RRC signaling. After establishment of the SRB specially used for the PC5 signaling message is completed, the PC5 signaling message in the SL is transmitted on the newly established SRB, and the SRB has a slightly lower priority.

In another implementation, that the first discovery message is transmitted between the upper layer and the MAC layer through a data logical channel may mean that the first discovery message is transmitted between the upper layer and the MAC layer through a DRB; and
 the first message in the SL includes RRC signaling in the SL and a PC5 signaling message in the SL, and the second message in the SL includes data in the SL; or the first message in the SL includes RRC signaling in the SL, and the second message in the SL includes data in the SL and a PC5 signaling message in the SL.

For the first message and the second message in the SL, reference may be made to descriptions in the foregoing implementation. Details are not described herein again.

In this implementation, all messages can be appropriately prioritized in a case that the first discovery message is transmitted between the upper layer and the MAC layer through the DRB, so that the terminal can send or receive important messages preferentially, and that the overall performance of the communications system is better.

Optionally, in the implementation in which the first discovery message is transmitted through the control logical channel or the data logical channel, a plurality of messages with the third priority are transmitted on a DRB;
 at least two of the plurality of messages with the third priority have different priorities; and
 when the plurality of messages with the third priority cannot be sent simultaneously, based on a priority order, messages with higher priorities are preferentially sent or some of the plurality of messages with the third priority are preferentially discarded.

The plurality of messages with the third priority may include a second message in the UL and a second message in the SL, or may include a second message in the UL, a second message in the SL, and the first discovery message. For example, the second message in the SL includes a PC5 signaling message. The PC5 signaling message and/or the first discovery message may be assigned a special LCID or QoS related parameter (for example, a QFI/PFI or a PQI/VQI). When the terminal cannot send data in the SL, the second message in the UL, the PC5 signaling message, and the first discovery message simultaneously, a message with a higher priority may be preferentially sent, or one, two, or three messages with a lower priority are preferentially discarded.

For details of this implementation, reference may be made to the corresponding description of the foregoing implementation of transparently transmitting the first discovery message. Details are not described herein again. In addition, a same beneficial effect can be achieved.

Optionally, in the implementation in which the first discovery message is transmitted through the control logical channel or the data logical channel, the priority of the second message in the UL is different from the priority of the second message in the SL; and
 if the priority of the second message in the UL is lower than a first threshold, the second message in the UL is preferential; if the priority of the second message in the UL is not lower than the first threshold, and the priority of the second message in the SL is lower than a second threshold, the second message in the SL is preferential; or if the priority of the second message in the UL is not lower than the first threshold, and the priority of the second message in the SL is not lower than the second threshold, the second message in the UL is preferential;
 or
 if the priority of the second message in the SL is lower than a first threshold, the second message in the SL is preferential; if the priority of the second message in the SL is not lower than the first threshold, and the priority of the second message in the UL is lower than a second threshold, the second message in the UL is preferential; or if the priority of the second message in the SL is not lower than the first threshold, and the priority of the second message in the UL is not lower than the second threshold, the second message in the SL is preferential;
 or
 if the priority of the second message in the SL is lower than a first threshold, and the priority of the second message in the UL is not lower than a second threshold, the second message in the SL is preferential; or if the priority of the second message in the SL is not lower than a first threshold, and the priority of the second message in the UL is lower than a second threshold, the second message in the UL is preferential;
 or
 if the priority of the second message in the SL is not lower than a first threshold, and the priority of the second message in the UL is lower than a second threshold, the second message in the UL is preferential; or if the priority of the second message in the SL is lower than a first threshold, and the priority of the second message in the UL is not lower than a second threshold, the second message in the SL is preferential;
 or
 in a first case, the second message in the SL is preferential; in a second case, the second message in the UL is preferential; or in cases other than the first case and the second case, the priority of the second message in the SL and the priority of the second message in the UL are determined by the terminal, where the first case is: the priority of the second message in the SL is lower than a first threshold, and the priority of the second message in the UL is not lower than a second threshold, and the second case is: the priority of the second message in the SL is not lower than the first threshold, and the priority of the second message in the UL is lower than the second threshold.

For details of this implementation, reference may be made to the corresponding description of the foregoing implementation of transparently transmitting the first discovery message. Details are not described herein again. In addition, a same beneficial effect can be achieved.

In an optional implementation, in priorities of the first discovery message, a priority of sending the first discovery message is higher than a priority of receiving the first discovery message; and/or in priorities of the second message in the UL, a priority of sending the second message in the UL is higher than a priority of receiving the second message in the UL; and/or in priorities of the second message in the SL, a priority of sending the second message in the SL is higher than a priority of receiving the second message in the SL.

In this implementation, priorities of sending and receiving messages may be further distinguished, so that messages can be sent and received more appropriately, to improve the overall performance of the communications system.

It should be noted that, in this embodiment of this disclosure, in addition to transmission of the first discovery message, other messages such as the first message and the second message in the SL, and the first message and the second message in the UL may be transmitted based on the foregoing defined priorities.

In this embodiment of this disclosure, the first discovery message in the SL is transmitted, where the first discovery message is transparently transmitted between the upper layer and the MAC layer, and the priority of the first discovery message is determined based on whether the first discovery message is used for public safety; or the first discovery message is transmitted between the upper layer and the MAC layer through the logical channel, and the priority of the first discovery message is determined based on the logical channel and/or the corresponding bearer. Because the discovery message is supported, the terminal discovery effect is improved. In addition, priorities of various messages are defined in this embodiment of this disclosure, so that the terminal can preferentially send or receive an important message, to improve communication performance of the terminal.

The following uses a plurality of embodiments to describe the message transmission method provided in the embodiment shown in FIG. 2. In the following embodiments, RACH random access msg 1/3 (msg A) transmission on the Uu interface and emergency communication (such as an emergency PDU connection) related transmission may represent the first message in the SL, PC5-RRC related signaling on the SL PC5 interface represents the RRC signaling in the SL, data on the SL PC5 interface represents the data in the SL, non-RACH random access msg 1/3 (msg A) transmission on the Uu interface and emergency communication (such as an emergency PDU connection) related transmission represent the second message in the SL, and PC5-S signaling on the SL PC5 interface represents the PC5 signaling message.

Embodiment 1

In this embodiment, there is no corresponding logical channel for a discovery message, the discovery message is transmitted through a physical channel, and PC5-S signaling is transmitted through a DRB.

Priorities may be defined as follows:
1. RACH random access msg 1/3 (msg A) transmission on the Uu interface and emergency communication (such as an emergency PDU connection) related transmission;
1.5. transmission or reception of a discovery message used for public safety on the SL PC5 interface (optional);
2. PC5-RRC related signaling on the SL PC5 interface;
2.5. transmission or reception of a discovery message used for public safety on the SL PC5 interface (optional);
3. data on the SL PC5 interface, or data in non-RACH random access msg 1/3 (msg A) transmission on the Uu interface and emergency communication (such as an emergency PDU connection) related transmission (depending on QoS of data), and PC5-S signaling on the SL PC5 interface;
3.5. transmission or reception of a discovery message used for public safety on the SL PC5 interface (optional); and
4. a discovery message used for non-public safety on the SL PC5 interface.

A general principle is: 1>2>3>4, and a priority of the discovery message related to public safety may be higher than a priority of PC5-RRC signaling, or may be between a priority of PC5-RRC signaling and a priority of PC5 data or a priority of Uu other data or a priority of PC5-S signaling, or may be lower than a priority of PC5 data or a priority of Uu other data or a priority of PC5-S signaling, that is, any one of the foregoing 1.5, 2.5, and 3.5 may be selected.

If there is a configuration similar to a discovery gap, in addition, within the gap, discovery messages for public safety and non-public safety are all higher than PC5 data or Uu other data or PC5-S signaling.

The discovery message for non-public safety may only indicate non-public safety or commercial. It is also possible to further specifically indicate what the discovery is used for, such as for NCIS, or for group discovery, or for relay discovery.

In addition, for the priority 3, because all the three can be transmitted on a data channel, a special LCID or QoS related parameter (QFI/PFI or PQI/VQI) may be assigned to the PC5-S signaling on the SL PC5 interface. When the terminal cannot send the three simultaneously, based on a priority order, one with a higher priority is preferentially transmitted, or one or two with a lower priority are preferentially discarded.

Embodiment 2

In this embodiment, there is no corresponding logical channel for a discovery message, the discovery message is transmitted through a physical channel, and PC5-S signaling is transmitted through an SRB.

Priorities may be defined as follows:
1. RACH random access msg 1/3 (msg A) transmission on the Uu interface and emergency communication (such as an emergency PDU connection) related transmission;
1.5. transmission or reception of a discovery message used for public safety on the SL PC5 interface (optional);
2. PC5-RRC related signaling on the SL PC5 interface, and PC5-S signaling on the SL PC5 interface;
2.5. transmission or reception of a discovery message used for public safety on the SL PC5 interface (optional);

3. data on the SL PC5 interface, or data in non-RACH random access msg 1/3 (msg A) transmission on the Uu interface and emergency communication (such as an emergency PDU connection) related transmission (depending on QoS of data), and PC5-S signaling on the SL PC5 interface;

3.5. transmission or reception of a discovery message used for public safety on the SL PC5 interface (optional); and 4. a discovery message used for non-public safety on the SL PC5 interface.

A general principle is still 1>2>3>4. In addition, for the foregoing 1.5, 2.5, and 3.5, reference may be made to the corresponding description of Embodiment 1.

For the priority 2, if there is only one SRB (such as a default SRB) on the SL PC5, the PC5-RRC related signaling on the SL PC5 interface and the PC5-S signaling on the SL PC5 interface have a same priority. If there is more than one SRB, it may be considered that the PC5-RRC related signaling on the SL PC5 interface and the PC5-S signaling on the SL PC5 interface are placed on different SRBs, where priorities are: PC5-RRC related signaling>PC5-S signaling on the SL PC5 interface.

For example, the SRB used for the PC5-S signaling on the SL PC5 interface is configured by using PC5-RRC signaling. After establishment of the SRB specially used for the PC5-S signaling is completed, the PC5-S signaling on the SL PC5 interface is transmitted on the newly established SRB.

For the priority 3, QoS of the data on the SL PC5 interface and the data in the non-RACH random access msg 1/3 (msg A) transmission on the Uu interface and emergency communication (such as an emergency PDU connection) related transmission needs to be comprehensively considered for determining the priority thereof.

A possible manner is as follows:

Solution 1 (Two Thresholds):

Two thresholds for determining the data on the SL PC5 interface and the data on the Uu interface are defined (the data herein refers to other Uu interface data determined by excluding the Uu interface data with the priority 1).

If the priority of the data on the Uu interface is lower than the threshold 1, the data on the Uu interface is preferential, or else (if the priority of the data on the Uu interface is not lower than the threshold 1), the data on the PC5 interface is preferential, or if the priority of the data on the Uu interface is not lower than the threshold 1, and the priority of the data on the PC5 interface is lower than the threshold 2, the data on the PC5 interface may be preferential; or if the priority of the data on the PC5 interface is lower than the threshold 1, the data on the PC5 interface is preferential; or if the priority of the data on the PC5 interface is not lower than the threshold 1, the data on the Uu interface is preferential, or if the priority of the data on the PC5 interface is not lower than the threshold 1, and the priority of the data on the Uu interface is lower than the threshold 2, the data on the Uu interface may be preferential.

Solution 2 (Two Thresholds):

If the priority of the data on the SL interface is lower than the threshold 1, the data on the SL interface is preferential, or else (if the priority of the data on the SL interface is not lower than the threshold 1), the data on the Uu interface is preferential, or if the priority of the data on the SL interface is not lower than the threshold 1, and the priority of the data on the Uu interface is lower than the threshold 2, the data on the Uu interface may be preferential; or if the priority of the data on the Uu interface is lower than the threshold 1, the data on the Uu interface is preferential; or if the priority of the data on the Uu interface is not lower than the threshold 1, the data on the PC5 interface is preferential, or if the priority of the data on the Uu interface is not lower than the threshold 1, and the priority of the data on the PC5 interface is lower than the threshold 2, the data on the PC5 interface may be preferential.

Solution 3 (Comprehensive Consideration)

If an SL priority is high enough and a UL priority is low enough, SL transmission is preferential; or if an SL priority is not high enough and a UL priority is not low enough, UL transmission is preferential.

Solution 4 (Comprehensive Consideration)

If an SL priority is low enough and a UL priority is high enough, UL transmission is preferential; or if an SL priority is not low enough and a UL priority is not high enough, SL transmission is preferential.

Solution 5 (Comprehensive Consideration)

If an SL priority is high enough and a UL priority is low enough, SL transmission is preferential; or if an SL priority is low enough and a UL priority is high enough, UL transmission is preferential; and the rest is left to the terminal for implementation.

The foregoing priority may be a UL/SL LCH priority configured by the network side or preconfigured, or a PPPP, or a PQI/5QI, or a priority field in a PQI/5QI.

Embodiment 3

In this embodiment, a discovery message is transmitted on an SRB, and PC5-S signaling is transmitted on an SRB.

The following priorities are defined:

1. RACH random access msg 1/3 (msg A) transmission on the Uu interface and emergency communication (such as an emergency PDU connection) related transmission;

2. PC5-RRC related signaling on the SL PC5 interface, PC5-S signaling on the SL PC5 interface, and a discovery related message; and 3. data on the SL PC5 interface, or data in non-RACH random access msg 1/3 (msg A) transmission on the Uu interface and emergency communication (such as an emergency PDU connection) related transmission (depending on QoS of data).

For the priority 2, if there is only one SRB (such as a default SRB) on the SL PC5, the PC5-RRC related signaling on the SL PC5 interface, the PC5-S signaling on the SL PC5 interface, and the discovery related message have a same priority. If there is more than one SRB, it may be considered that the PC5-RRC related signaling on the SL PC5 interface, the PC5-S signaling on the SL PC5 interface, and the discovery related message are placed on two or three different SRBs, where priorities are: PC5-RRC related signaling≥discovery related message>PC5-S signaling on the SL PC5 interface.

For example, in a possible case, the discovery related message is transmitted by using the default SRB with the highest priority, the PC5-RRC related signaling is transmitted by using the default SRB or a dedicated SRB also with the highest priority, and the SRB used for the PC5-S signaling on the SL PC5 interface is configured by using PC5-RRC signaling. After establishment of the SRB specially used for the PC5-S signaling is completed, the PC5-S signaling on the SL PC5 interface is transmitted on the newly established SRB, and the SRB has a slightly lower priority.

Embodiment 4

In this embodiment, a discovery message is transmitted on an SRB, and PC5-S signaling is transmitted on a DRB.
The following priorities are defined:
1. RACH random access msg 1/3 (msg A) transmission on the Uu interface and emergency communication (such as an emergency PDU connection) related transmission;
2. PC5-RRC related signaling on the SL PC5 interface, and a discovery related message; and
3. data on the SL PC5 interface, or data in non-RACH random access msg 1/3 (msg A) transmission on the Uu interface and emergency communication (such as an emergency PDU connection) related transmission (depending on QoS of data), and PC5-S signaling on the SL PC5 interface.

The implementation of the priority 2 may be the same as the implementation of the priority 2 in Embodiment 3, except that three are replaced with two.

For the priority 3, the implementation is the same as the implementations of the priority 3 in Embodiment 1 and Embodiment 2.

Embodiment 5

In this embodiment, a discovery message is transmitted on a DRB, and PC5-S signaling is transmitted on an SRB.
The following priorities are defined:
1. RACH random access msg 1/3 (msg A) transmission on the Uu interface and emergency communication (such as an emergency PDU connection) related transmission;
2. PC5-RRC related signaling on the SL PC5 interface, and PC5-S signaling on the SL PC5 interface; and
3. data on the SL PC5 interface, or data in non-RACH random access msg 1/3 (msg A) transmission on the Uu interface and emergency communication (such as an emergency PDU connection) related transmission (depending on QoS of data), and a discovery related message.

For this embodiment, reference may be made to the implementation of Embodiment 4, with only positions of the PC5-S signaling on the SL PC5 interface and the discovery related message exchanged.

Embodiment 6

In this embodiment, a discovery message is transmitted on a DRB, and PC5-S signaling is transmitted on a DRB.
The following priorities are defined:
1. RACH random access msg 1/3 (msg A) transmission on the Uu interface and emergency communication (such as an emergency PDU connection) related sending and receiving;
2. PC5-RRC related signaling on the SL PC5 interface; and
3. data on the SL PC5 interface, or data in non-RACH random access msg 1/3 (msg A) transmission on the Uu interface and emergency communication (such as an emergency PDU connection) related transmission (depending on QoS of data), PC5-S signaling on the SL PC5 interface, and a discovery related message.

In this embodiment, for the priority 3, reference may be made to the implementation of the priority 3 in Embodiment 1 and Embodiment 2. A special LCID or QoS related parameter (QFI/PFI or PQI/VQI) may be assigned to the PC5-S signaling on the SL PC5 interface and/or the discovery related message. When the terminal cannot send the four simultaneously, the terminal preferentially discard one, two, or three with a lower priority based on a priority order.

Embodiment 7

In this embodiment, priorities of receiving and sending different signaling are further distinguished.

Further, one or more of the following three types may be further distinguished and assigned different priorities: sending and receiving data on the Uu interface (including Uu data that is always preferential in the priority 1 and Uu data needs to be compared with the SL interface in the priority 3), sending and receiving data on the SL interface, and sending and receiving a discovery message. Some possible cases are as follows:

For example, for Embodiment 2, the following priority are defined:
1. RACH random access msg 1/3 (msg A) transmission on the Uu interface and emergency communication (such as an emergency PDU connection) related sending or receiving;
1.5. sending a discovery message used for public safety on the SL PC5 interface;
2. sending or receiving PC5-RRC related signaling on the SL PC5 interface, and sending or receiving PC5-S signaling on the SL PC5 interface;
3. sending data on the SL PC5 interface, or data in non-RACH random access msg 1/3 (msg A) transmission on the Uu interface and emergency communication (such as an emergency PDU connection) related transmission (depending on QoS of data);
3.5. receiving a discovery message used for public safety on the SL PC5 interface;
3.6. receiving data on the SL PC5 interface, or data in non-RACH random access msg 1/3 (msg A) transmission on the Uu interface and emergency communication (such as an emergency PDU connection) related transmission (depending on QoS of data); and
4. sending or receiving a discovery message used for non-public safety on the SL PC5 interface.
1.5<2 or 1.5=2. For 2, further prioritization is allowed. For details, reference may be made to the implementation of the priority 2 in Embodiment 1.

Descriptions of the priorities defined in Embodiment 1 to Embodiment 6 may be as follows:

In one case, priorities are defined for corresponding messages separately. For example, different LCIDs (LCIDs correspond to different priorities) or QoS related parameters (QFI/PFI or PQI/VQI) are defined for different messages, and finally, priorities associated with the messages (such as logical channel priorities) are compared for implementation. In this case, for logical channels with different priorities, when the terminal cannot transmit all types of logical channels simultaneously, logical channels with higher priorities are preferentially transmitted, or logical channels with lower priorities are preferentially discarded.

In another case, priorities may not need to be defined for corresponding messages separately, and because messages are transmitted on different bearers or logical channels, priorities of the messages follow the priorities of the bearers or logical channels (for example, if the discovery message is mapped to the default SRB and then transmitted on an SCCH, and a priority of the SCCH is 1, the priority corresponding to the discovery message is also 1).

The embodiments of this disclosure can be implemented as follows:

Comparison of priorities of a plurality of types of UL/SL messages such as a PC5-discovery message, PC5-S signaling, PC5-RRC signaling, PC5 interface data, and Uu interface data is comprehensively considered.

Further distinguishing whether the PC5-discovery message is related to public safety and assigning different priorities are considered.

Determining the priority of the data on the SL PC5 interface and the priority of the data on the Uu interface by using two thresholds is considered.

Sending and receiving data on the Uu interface, sending and receiving data on the PC5 interface, and sending and receiving a discovery message are considered, and one or more of the three types are further distinguished and assigned different priorities.

In the embodiments of this disclosure, defining the priorities enables the terminal to send or receive important messages preferentially, so that the overall performance of the communications system is better.

Figure 3:
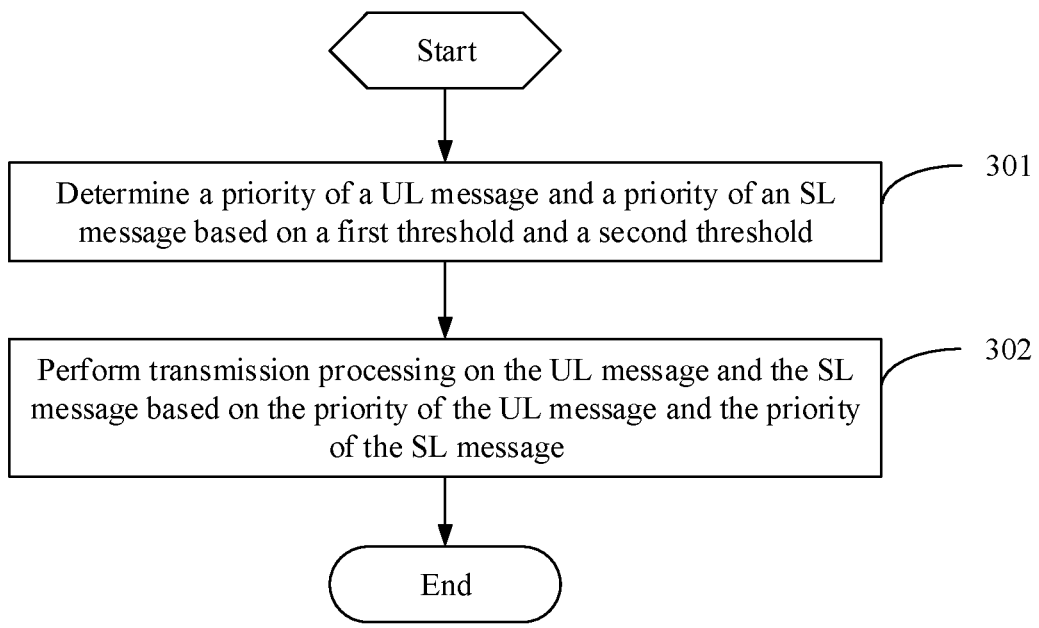
FIG. 3 is a flowchart of another message transmission method according to an embodiment of this disclosure.

FIG. 3 is a flowchart of a message transmission method according to an embodiment of this disclosure. The method is applied to a terminal. As shown in FIG. 3, the method includes the following steps.

Step 301: Determine a priority of a UL message and a priority of an SL message based on a first threshold and a second threshold.

The first threshold and the second threshold may be configured by a network or prescribed by a protocol. In addition, for the first threshold and the second threshold, reference may be made to the corresponding description of the embodiment shown in FIG. 2. Details are not described herein again.

Step 302: Perform transmission processing on the UL message and the SL message based on the priority of the UL message and the priority of the SL message.

The performing transmission processing on the UL message and the SL message may be preferentially transmitting a message with a higher priority and then transmitting a message with a lower priority based on a priority order, or may be transmitting a message with a higher priority and discarding a message with a lower priority. Certainly, if the terminal can transmit a plurality of messages simultaneously, the UL message and the SL message can be simultaneously transmitted. The transmission herein may be sending or receiving.

In addition, the UL message and the SL message may be the second message in the UL and the second message in the SL in the embodiment shown in FIG. 2. Certainly, this is not limited. For example, the UL message and the SL message may be a message in the UL and a message in the SL that are transmitted on a same logical channel.

In this embodiment, the UL message and the SL message can be appropriately transmitted based on the foregoing priorities in the foregoing steps to improve transmission performance of the terminal. Therefore, a problem in the related art that transmission performance of a terminal is relatively poor due to inability to distinguish a priority of a UL message and a priority of an SL message is resolved.

Optionally, the priority of the UL message is different from the priority of the SL message; and if the priority of the UL message is lower than the first threshold, the UL message is preferential; if the priority of the UL message is not lower than the first threshold, and the priority of the SL message is lower than the second threshold, the SL message is preferential; or if the priority of the UL message is not lower than the first threshold, and the priority of the SL message is not lower than the second threshold, the UL message is preferential;

or if the priority of the SL message is lower than the first threshold, the SL message is preferential; if the priority of the SL message is not lower than the first threshold, and the priority of the UL message is lower than the second threshold, the UL message is preferential; or if the priority of the SL message is not lower than the first threshold, and the priority of the UL message is not lower than the second threshold, the SL message is preferential;

or if the priority of the SL message is lower than the first threshold, and the priority of the UL message is not lower than the second threshold, the SL message is preferential; or if the priority of the SL message is not lower than the first threshold, and the priority of the UL message is lower than the second threshold, the UL message is preferential;

or if the priority of the SL message is not lower than the first threshold, and the priority of the UL message is lower than the second threshold, the UL message is preferential; or if the priority of the SL message is lower than the first threshold, and the priority of the UL message is not lower than the second threshold, the SL message is preferential;

or in a first case, the SL message is preferential; in a second case, the UL message is preferential; or in cases other than the first case and the second case, the priority of the SL message and the priority of the UL message are determined by the terminal, where the first case is: the priority of the SL message is lower than the first threshold, and the priority of the UL message is not lower than the second threshold, and the second case is: the priority of the SL message is lower than the first threshold, and the priority of the UL message is lower than the second threshold.

Optionally, the SL message includes at least one of SL data, an SL PC5 signaling message, and an SL discovery message; and the UL message is a message other than a random access message, an emergency communication message, and a first service message in a UL.

For the priority of the UL message and the priority of the SL message, reference may be made to the implementations of the first threshold and the second threshold provided in the embodiment shown in FIG. 2. Details are not described herein again. In addition, a same beneficial effect can be achieved.

Figure 4:
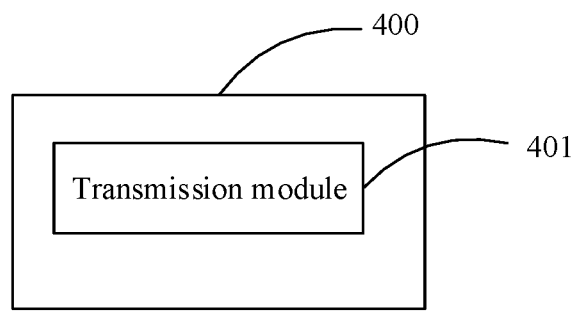
FIG. 4 is a structural diagram of a terminal according to an embodiment of this disclosure.

FIG. 4 is a structural diagram of a terminal according to an embodiment of this disclosure. As shown in FIG. 4, the terminal 400 includes:

a transmission module 401, configured to transmit a first discovery message in an SL, where the first discovery message is transparently transmitted between an upper layer and a MAC layer, and a priority of the first discovery message is determined based on whether the first discovery message is used for public safety; or the first discovery message is transmitted between an upper layer and a MAC layer through a logical channel, and a priority of the first discovery message is determined based on the logical channel and/or a corresponding bearer.

Optionally, in a case that the first discovery message is transparently transmitted between the upper layer and the MAC layer, the priority of the first discovery message is determined based on the following:

a first message in an uplink UL has a first priority, a first message in the SL has a second priority, a second message in the UL and a second message in the SL have a third priority, the first priority is higher than or equal to the second priority, and the second priority is higher than the third priority, where a priority of a discovery message used for public safety is higher than or equal to the second priority, or higher than the third priority, or lower than the third priority;

a priority of a discovery message used for non-public safety is higher than the third priority, or lower than the third priority; and the priority of the discovery message used for public safety is higher than the priority of the discovery message used for non-public safety.

Optionally, in a case that a discovery gap is configured for the SL, the priorities of the discovery message used for public safety and the discovery message used for non-public safety within the discovery gap are higher than the third priority.

Optionally, the first discovery message includes indication information, and the indication information is used to indicate that the first discovery message is a discovery message used for public safety or a discovery message used for non-public safety or commerce.

Optionally, the indication information is further used to indicate discovery content of the first discovery message.

Optionally, the first message in the UL includes at least one of a random access message in the UL, an emergency communication message in the UL, and a first service message in the UL, and the second message in the UL is a message in the UL other than the first message in the UL; and the first message in the SL includes radio resource control RRC signaling in the SL, and the second message in the SL includes at least one of data in the SL and a PC5 signaling message in the SL; or the first message in the SL includes at least one of RRC signaling in the SL and a PC5 signaling message in the SL, and the second message in the SL includes data in the SL.

Optionally, in a case that the first message in the SL includes the RRC signaling in the SL and the PC5 signaling message in the SL, the RRC signaling in the SL and the PC5 signaling message in the SL are transmitted through a same signaling radio bearer SRB, and the RRC signaling in the SL and the PC5 signaling message in the SL have a same priority; or the RRC signaling in the SL and the PC5 signaling message in the SL are transmitted through different SRBs, where an SRB used for the PC5 signaling message in the SL is configured by using RRC signaling in the SL, and if establishment of the SRB used for the PC5 signaling message in the SL is completed, the PC5 signaling message in the SL is transmitted on the established SRB, and a priority of the RRC signaling in the SL is higher than a priority of the PC5 signaling message in the SL.

Optionally, in a case that the first discovery message is transmitted between the upper layer and the MAC layer through a control logical channel, the priority of the first discovery message is a priority of an SRB or the control logical channel that transmits the first discovery message.

Optionally, in a case that the control logical channel includes SRBs with different priorities, the first discovery message and a message in the SL are transmitted on SRBs with different priorities on the control logical channel, the priority of the first discovery message is the priority of the SRB that transmits the first discovery message, and the message in the SL includes at least one of RRC signaling in the SL and a PC5 signaling message in the SL.

Optionally, in a case that the first discovery message is transmitted between the upper layer and the MAC layer through a data logical channel, the first discovery message is assigned a quality of service QoS parameter, the first discovery message is mapped to the corresponding data logical channel by the terminal based on the QoS parameter, and the priority of the first discovery message is a priority of a DRB or the data logical channel that transmits the first discovery message; or the first discovery message is assigned a logical channel identifier LCID, and the priority of the first discovery message is a priority of a logical channel corresponding to the LCID.

Optionally, in a case that the first discovery message is transmitted between the upper layer and the MAC layer through a control logical channel, the priority of the first discovery message is determined based on the following:

a first message in a UL has a first priority, a first message and the first discovery message in the SL have a second priority, a second message in the UL and a second message in the SL have a third priority, the first priority is higher than or equal to the second priority, and the second priority is higher than the third priority;

or in a case that the first discovery message is transmitted between the upper layer and the MAC layer through a data logical channel, the priority of the first discovery message is determined based on the following:

a first message in a UL has a first priority, a first message in the SL has a second priority, a second message in the UL and a second message and the first discovery message in the SL have a third priority, the first priority is higher than or equal to the second priority, and the second priority is higher than the third priority.

Optionally, that the first discovery message is transmitted between the upper layer and the MAC layer through a control logical channel means that the first discovery message is transmitted between the upper layer and the MAC layer through an SRB; and the first message in the SL includes RRC signaling in the SL and a PC5 signaling message in the SL, and the second message in the SL includes data in the SL; or the first message in the SL includes RRC signaling in the SL, and the second message in the SL includes data in the SL and a PC5 signaling message in the SL.

Optionally, the first discovery message and the first message in the SL are transmitted through the same SRB, and the priority of the first discovery message and the priority of the first message in the SL are the same; or the first discovery message and the first message in the SL are transmitted on at least two SRBs, a priority of the RRC signaling in the SL is higher than or equal to the priority of the first discovery message, and the priority of the first discovery message is higher than or equal to a priority of the PC5 signaling message in the SL.

Optionally, the first discovery message is transmitted on a first SRB, the RRC signaling in the SL is transmitted on the first SRB or a second SRB, a third SRB used for the PC5 signaling message in the SL is configured by using RRC signaling in the SL, and if establishment of the third SRB is completed, the PC5 signaling message in the SL is transmitted on the third SRB, where a priority of the first SRB and a priority of the second SRB are the highest on the control logical channel, and a priority of the third SRB is lower than the priority of the first SRB and the priority of the second SRB.

Optionally, that the first discovery message is transmitted between the upper layer and the MAC layer through a data logical channel means that the first discovery message is transmitted between the upper layer and the MAC layer through a data radio bearer DRB; and the first message in the SL includes RRC signaling in the SL and a PC5 signaling message in the SL, and the second message in the SL includes data in the SL; or the first message in the SL includes RRC signaling in the SL, and the second message in the SL includes data in the SL and a PC5 signaling message in the SL.

Optionally, a plurality of messages with the third priority are transmitted on a DRB;

at least two of the plurality of messages with the third priority have different priorities; and when the plurality of messages with the third priority cannot be sent simultaneously, based on a priority order, messages with higher priorities are preferentially sent or some of the plurality of messages with the third priority are preferentially discarded.

Optionally, the priority of the second message in the UL is different from the priority of the second message in the SL; and if the priority of the second message in the UL is lower than a first threshold, the second message in the UL is preferential; if the priority of the second message in the UL is not lower than the first threshold, and the priority of the second message in the SL is lower than a second threshold, the second message in the SL is preferential; or if the priority of the second message in the UL is not lower than the first threshold, and the priority of the second message in the SL is not lower than the second threshold, the second message in the UL is preferential;

or if the priority of the second message in the SL is lower than a first threshold, the second message in the SL is preferential; if the priority of the second message in the SL is not lower than the first threshold, and the priority of the second message in the UL is lower than a second threshold, the second message in the UL is preferential; or if the priority of the second message in the SL is not lower than the first threshold, and the priority of the second message in the UL is not lower than the second threshold, the second message in the SL is preferential;

or if the priority of the second message in the SL is lower than a first threshold, and the priority of the second message in the UL is not lower than a second threshold, the second message in the SL is preferential; or if the priority of the second message in the SL is not lower than a first threshold, and the priority of the second message in the UL is lower than a second threshold, the second message in the UL is preferential;

or if the priority of the second message in the SL is not lower than a first threshold, and the priority of the second message in the UL is lower than a second threshold, the second message in the UL is preferential; or if the priority of the second message in the SL is lower than a first threshold, and the priority of the second message in the UL is not lower than a second threshold, the second message in the SL is preferential;

or in a first case, the second message in the SL is preferential; in a second case, the second message in the UL is preferential; or in cases other than the first case and the second case, the priority of the second message in the SL and the priority of the second message in the UL are determined by the terminal, where the first case is: the priority of the second message in the SL is lower than a first threshold, and the priority of the second message in the UL is not lower than a second threshold, and the second case is: the priority of the second message in the SL is not lower than the first threshold, and the priority of the second message in the UL is lower than the second threshold.

Optionally, in priorities of the first discovery message, a priority of sending the first discovery message is higher than a priority of receiving the first discovery message; and/or in priorities of the second message in the UL, a priority of sending the second message in the UL is higher than a priority of receiving the second message in the UL; and/or in priorities of the second message in the SL, a priority of sending the second message in the SL is higher than a priority of receiving the second message in the SL.

The terminal provided in this embodiment of this disclosure is capable of implementing each process implemented by the terminal in the method embodiment in FIG. 2. To avoid repetition, details are not described herein again. In addition, a terminal discovery effect can be improved.

Figure 5:
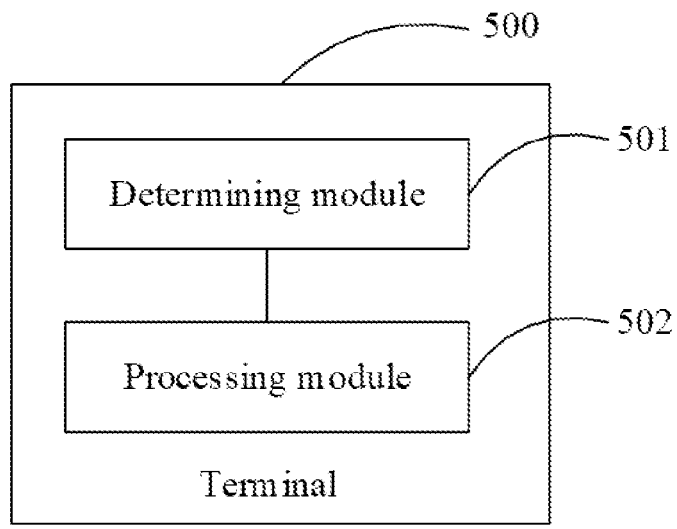
FIG. 5 is a structural diagram of another terminal according to an embodiment of this disclosure.

FIG. 5 is a structural diagram of another terminal according to an embodiment of this disclosure. As shown in FIG. 5, the terminal 500 includes:

a determining module 501, configured to determine a priority of a UL message and a priority of an SL message based on a first threshold and a second threshold; and a processing module 502, configured to perform transmission processing on the UL message and the SL message based on the priority of the UL message and the priority of the SL message.

Optionally, the priority of the UL message is different from the priority of the SL message; and if the priority of the UL message is lower than the first threshold, the UL message is preferential; if the priority of the UL message is not lower than the first threshold, and the priority of the SL message is lower than the second threshold, the SL message is preferential; or if the priority of the UL message is not lower than the first threshold, and the priority of the SL message is not lower than the second threshold, the UL message is preferential;

or if the priority of the SL message is lower than the first threshold, the SL message is preferential; if the priority of the SL message is not lower than the first threshold, and the priority of the UL message is lower than the second threshold, the UL message is preferential; or if the priority of the SL message is not lower than the first threshold, and the priority of the UL message is not lower than the second threshold, the SL message is preferential;

or if the priority of the SL message is lower than the first threshold, and the priority of the UL message is not lower than the second threshold, the SL message is preferential; or if the priority of the SL message is not lower than the first threshold, and the priority of the UL message is lower than the second threshold, the UL message is preferential;

or if the priority of the SL message is not lower than the first threshold, and the priority of the UL message is lower than the second threshold, the UL message is preferential; or if the priority of the SL message is lower than the first threshold, and the priority of the UL message is not lower than the second threshold, the SL message is preferential;

or in a first case, the SL message is preferential; in a second case, the UL message is preferential; or in cases other than the first case and the second case, the priority of the SL message and the priority of the UL message are determined by a terminal, where the first case is: the priority of the SL message is lower than the first threshold, and the priority of the UL message is not lower than the second threshold, and the second case is: the priority of the SL message is lower than the first threshold, and the priority of the UL message is lower than the second threshold.

Optionally, the SL message includes at least one of SL data, an SL PC5 signaling message, and an SL discovery message; and the UL message is a message other than a random access message, an emergency communication message, and a first service message in a UL.

The terminal provided in this embodiment of this disclosure is capable of implementing each process implemented by the terminal in the method embodiment in FIG. 2. To avoid repetition, details are not described herein again. In addition, transmission performance of the terminal can be improved.

Figure 6:
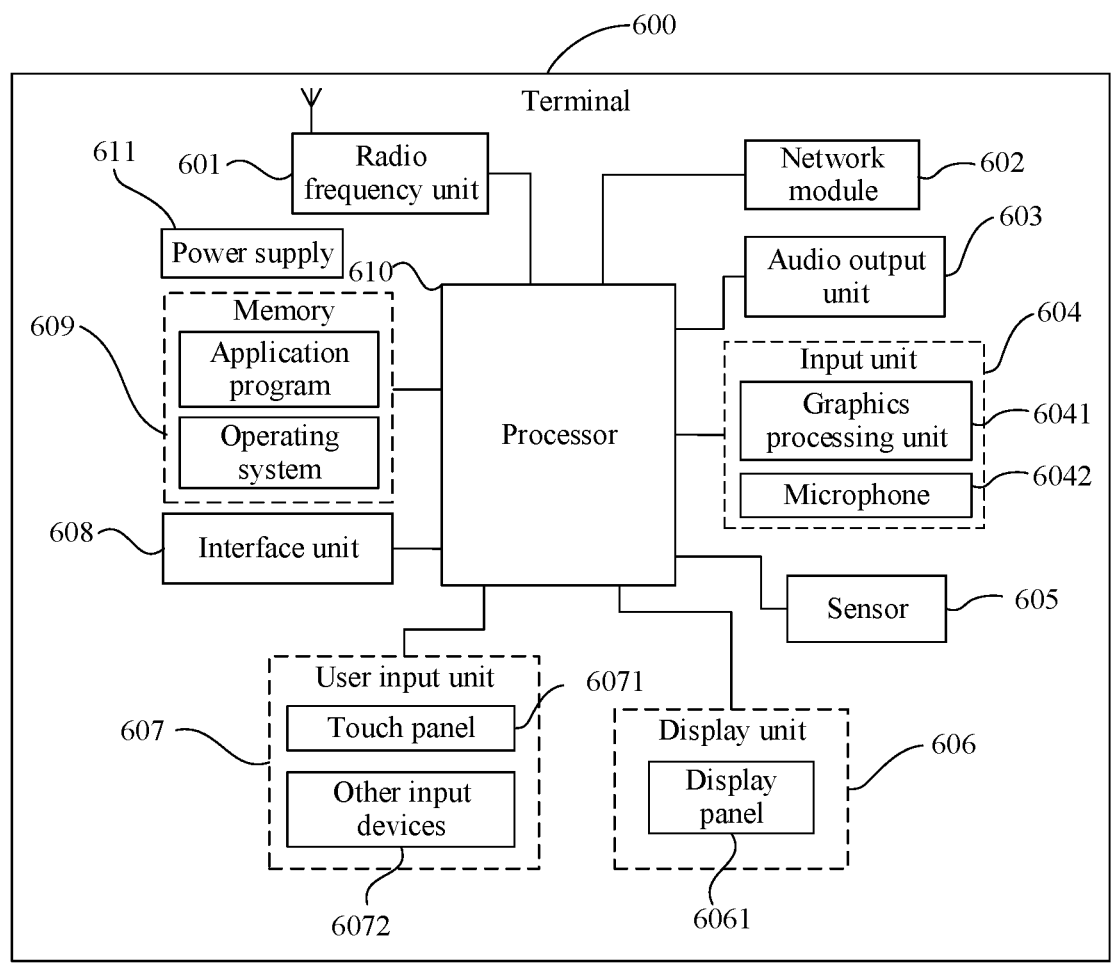
FIG. 6 is a structural diagram of another terminal according to an embodiment of this disclosure.

FIG. 6 is a schematic diagram of a hardware structure of a terminal for implementing the embodiments of this disclosure.

The terminal 600 includes but is not limited to components such as a radio frequency unit 601, a network module 602, an audio output unit 603, an input unit 604, a sensor 605, a display unit 606, a user input unit 607, an interface unit 608, a memory 609, a processor 610, and a power supply 611. A person skilled in the art may understand that the structure of the terminal shown in FIG. 6 does not constitute any limitation on the terminal. The terminal may include more or fewer components than those shown in the figure, or a combination of some components, or the components disposed differently. In this embodiment of this disclosure, the terminal includes, but is not limited to, a mobile phone, a tablet computer, a laptop computer, a vehicle-mounted terminal, a robot, a wearable device, a pedometer, and the like.

In an embodiment, the radio frequency unit 601 is configured to transmit a first discovery message in an SL, where the first discovery message is transparently transmitted between an upper layer and a MAC layer, and a priority of the first discovery message is determined based on whether the first discovery message is used for public safety; or the first discovery message is transmitted between an upper layer and a MAC layer through a logical channel, and a priority of the first discovery message is determined based on the logical channel and/or a corresponding bearer.

Optionally, in a case that the first discovery message is transparently transmitted between the upper layer and the MAC layer, the priority of the first discovery message is determined based on the following:

a first message in an uplink UL has a first priority, a first message in the SL has a second priority, a second message in the UL and a second message in the SL have a third priority, the first priority is higher than or equal to the second priority, and the second priority is higher than the third priority, where a priority of a discovery message used for public safety is higher than or equal to the second priority, or higher than the third priority, or lower than the third priority;

a priority of a discovery message used for non-public safety is higher than the third priority, or lower than the third priority; and the priority of the discovery message used for public safety is higher than the priority of the discovery message used for non-public safety.

Optionally, in a case that a discovery gap is configured for the SL, the priorities of the discovery message used for public safety and the discovery message used for non-public safety within the discovery gap are higher than the third priority.

Optionally, the first discovery message includes indication information, and the indication information is used to indicate that the first discovery message is a discovery message used for public safety or a discovery message used for non-public safety or commerce.

Optionally, the indication information is further used to indicate discovery content of the first discovery message.

Optionally, the first message in the UL includes at least one of a random access message in the UL, an emergency communication message in the UL, and a first service message in the UL, and the second message in the UL is a message in the UL other than the first message in the UL; and the first message in the SL includes radio resource control RRC signaling in the SL, and the second message in the SL includes at least one of data in the SL and a PC5 signaling message in the SL; or the first message in the SL includes at least one of RRC signaling in the SL and a PC5 signaling message in the SL, and the second message in the SL includes data in the SL.

Optionally, in a case that the first message in the SL includes the RRC signaling in the SL and the PC5 signaling message in the SL, the RRC signaling in the SL and the PC5 signaling message in the SL are transmitted through a same signaling radio bearer SRB, and the RRC signaling in the SL and the PC5 signaling message in the SL have a same priority; or the RRC signaling in the SL and the PC5 signaling message in the SL are transmitted through different SRBs, where an SRB used for the PC5 signaling message in the SL is configured by using RRC signaling in the SL, and if establishment of the SRB used for the PC5 signaling message in the SL is completed, the PC5 signaling message in the SL is transmitted on the established SRB, and a priority of the RRC signaling in the SL is higher than a priority of the PC5 signaling message in the SL.

Optionally, in a case that the first discovery message is transmitted between the upper layer and the MAC layer through a control logical channel, the priority of the first discovery message is a priority of an SRB or the control logical channel that transmits the first discovery message.

Optionally, in a case that the control logical channel includes SRBs with different priorities, the first discovery message and a message in the SL are transmitted on SRBs with different priorities on the control logical channel, the priority of the first discovery message is the priority of the SRB that transmits the first discovery message, and the message in the SL includes at least one of RRC signaling in the SL and a PC5 signaling message in the SL.

Optionally, in a case that the first discovery message is transmitted between the upper layer and the MAC layer through a data logical channel,
- the first discovery message is assigned a quality of service QoS parameter, the first discovery message is mapped to the corresponding data logical channel by the terminal based on the QoS parameter, and the priority of the first discovery message is a priority of a DRB or the data logical channel that transmits the first discovery message; or
- the first discovery message is assigned a logical channel identifier LCID, and the priority of the first discovery message is a priority of a logical channel corresponding to the LCID.

Optionally, in a case that the first discovery message is transmitted between the upper layer and the MAC layer through a control logical channel, the priority of the first discovery message is determined based on the following:
- a first message in a UL has a first priority, a first message and the first discovery message in the SL have a second priority, a second message in the UL and a second message in the SL have a third priority, the first priority is higher than or equal to the second priority, and the second priority is higher than the third priority; or
- in a case that the first discovery message is transmitted between the upper layer and the MAC layer through a data logical channel, the priority of the first discovery message is determined based on the following:
- a first message in a UL has a first priority, a first message in the SL has a second priority, a second message in the UL and a second message and the first discovery message in the SL have a third priority, the first priority is higher than or equal to the second priority, and the second priority is higher than the third priority.

Optionally, that the first discovery message is transmitted between the upper layer and the MAC layer through a control logical channel means that the first discovery message is transmitted between the upper layer and the MAC layer through an SRB; and
the first message in the SL includes RRC signaling in the SL and a PC5 signaling message in the SL, and the second message in the SL includes data in the SL; or the first message in the SL includes RRC signaling in the SL, and the second message in the SL includes data in the SL and a PC5 signaling message in the SL.

Optionally, the first discovery message and the first message in the SL are transmitted through the same SRB, and the priority of the first discovery message and the priority of the first message in the SL are the same; or the first discovery message and the first message in the SL are transmitted on at least two SRBs, a priority of the RRC signaling in the SL is higher than or equal to the priority of the first discovery message, and the priority of the first discovery message is higher than or equal to a priority of the PC5 signaling message in the SL.

Optionally, the first discovery message is transmitted on a first SRB, the RRC signaling in the SL is transmitted on the first SRB or a second SRB, a third SRB used for the PC5 signaling message in the SL is configured by using RRC signaling in the SL, and if establishment of the third SRB is completed, the PC5 signaling message in the SL is transmitted on the third SRB, where
a priority of the first SRB and a priority of the second SRB are the highest on the control logical channel, and a priority of the third SRB is lower than the priority of the first SRB and the priority of the second SRB.

Optionally, that the first discovery message is transmitted between the upper layer and the MAC layer through a data logical channel means that the first discovery message is transmitted between the upper layer and the MAC layer through a data radio bearer DRB; and
the first message in the SL includes RRC signaling in the SL and a PC5 signaling message in the SL, and the second message in the SL includes data in the SL; or the first message in the SL includes RRC signaling in the SL, and the second message in the SL includes data in the SL and a PC5 signaling message in the SL.

Optionally, a plurality of messages with the third priority are transmitted on a DRB;
at least two of the plurality of messages with the third priority have different priorities; and
when the plurality of messages with the third priority cannot be sent simultaneously, based on a priority order, messages with higher priorities are preferentially sent or some of the plurality of messages with the third priority are preferentially discarded.

Optionally, the priority of the second message in the UL is different from the priority of the second message in the SL; and
if the priority of the second message in the UL is lower than a first threshold, the second message in the UL is preferential; if the priority of the second message in the UL is not lower than the first threshold, and the priority of the second message in the SL is lower than a second threshold, the second message in the SL is preferential; or if the priority of the second message in the UL is not lower than the first threshold, and the priority of the second message in the SL is not lower than the second threshold, the second message in the UL is preferential; or
if the priority of the second message in the SL is lower than a first threshold, the second message in the SL is preferential; if the priority of the second message in the SL is not lower than the first threshold, and the priority of the second message in the UL is lower than a second threshold, the second message in the UL is preferential; or if the priority of the second message in the SL is not lower than the first threshold, and the priority of the second message in the UL is not lower than the second threshold, the second message in the SL is preferential; or
if the priority of the second message in the SL is lower than a first threshold, and the priority of the second message in the UL is not lower than a second threshold, the second message in the SL is preferential; or if the priority of the second message in the SL is not lower than a first threshold, and the priority of the second message in the UL is lower than a second threshold, the second message in the UL is preferential;

or if the priority of the second message in the SL is not lower than a first threshold, and the priority of the second message in the UL is lower than a second threshold, the second message in the UL is preferential; or if the priority of the second message in the SL is lower than a first threshold, and the priority of the second message in the UL is not lower than a second threshold, the second message in the UL is preferential, the second message in the SL is preferential;

or in a first case, the second message in the SL is preferential; in a second case, the second message in the UL is preferential; or in cases other than the first case and the second case, the priority of the second message in the SL and the priority of the second message in the UL are determined by the terminal, where the first case is: the priority of the second message in the SL is lower than a first threshold, and the priority of the second message in the UL is not lower than a second threshold, and the second case is: the priority of the second message in the SL is not lower than the first threshold, and the priority of the second message in the UL is lower than the second threshold.

Optionally, in priorities of the first discovery message, a priority of sending the first discovery message is higher than a priority of receiving the first discovery message; and/or in priorities of the second message in the UL, a priority of sending the second message in the UL is higher than a priority of receiving the second message in the UL; and/or in priorities of the second message in the SL, a priority of sending the second message in the SL is higher than a priority of receiving the second message in the SL.

The foregoing solution improves a terminal discovery effect.

In another embodiment, the processor 610 is configured to determine a priority of a UL message and a priority of an SL message based on a first threshold and a second threshold; and the radio frequency unit 601 is configured to perform transmission processing on the UL message and the SL message based on the priority of the UL message and the priority of the SL message.

Optionally, the priority of the UL message is different from the priority of the SL message; and if the priority of the UL message is lower than the first threshold, the UL message is preferential; if the priority of the UL message is not lower than the first threshold, and the priority of the SL message is lower than the second threshold, the SL message is preferential; or if the priority of the UL message is not lower than the first threshold, and the priority of the SL message is not lower than the second threshold, the UL message is preferential;

or if the priority of the SL message is lower than the first threshold, the SL message is preferential; if the priority of the SL message is not lower than the first threshold, and the priority of the UL message is lower than the second threshold, the UL message is preferential; or if the priority of the SL message is not lower than the first threshold, and the priority of the UL message is not lower than the second threshold, the SL message is preferential;

or if the priority of the SL message is lower than the first threshold, and the priority of the UL message is not lower than the second threshold, the SL message is preferential; or if the priority of the SL message is not lower than the first threshold, and the priority of the UL message is lower than the second threshold, the UL message is preferential;

or if the priority of the SL message is not lower than the first threshold, and the priority of the UL message is lower than the second threshold, the UL message is preferential; or if the priority of the SL message is lower than the first threshold, and the priority of the UL message is not lower than the second threshold, the SL message is preferential;

or in a first case, the SL message is preferential; in a second case, the UL message is preferential; or in cases other than the first case and the second case, the priority of the SL message and the priority of the UL message are determined by the terminal, where the first case is: the priority of the SL message is lower than the first threshold, and the priority of the UL message is not lower than the second threshold, and the second case is: the priority of the SL message is lower than the first threshold, and the priority of the UL message is lower than the second threshold.

Optionally, the SL message includes at least one of SL data, an SL PC5 signaling message, and an SL discovery message; and the UL message is a message other than a random access message, an emergency communication message, and a first service message in a UL.

The foregoing solution improves transmission performance of the terminal.

It should be understood that in this embodiment of this disclosure, the radio frequency unit 601 may be configured to receive and send information, or to receive and send a signal in a call process, and specially, after receiving downlink data from a base station, send the downlink data to the processor 610 for processing; and also send uplink data to the base station. Generally, the radio frequency unit 601 includes but is not limited to an antenna, at least one amplifier, a transceiver, a coupler, a low noise amplifier, a duplexer, and the like. In addition, the radio frequency unit 601 may also communicate with a network and other devices via a wireless communications system.

The terminal provides wireless broadband Internet access for a user by using the network module 602, for example, helps the user send and receive e-mails, browse web pages, and access streaming media.

The audio output unit 603 may convert audio data received by the radio frequency unit 601 or the network module 602 or stored in the memory 609 into an audio signal and output the audio signal as a sound. Furthermore, the audio output unit 603 may also provide audio output (for example, a call signal received sound or a message received sound) related to a specific function performed by the terminal 600. The audio output unit 603 includes a speaker, a buzzer, a receiver, and the like.

The input unit 604 is configured to receive an audio or video signal. The input unit 604 may include a graphics processing unit (Graphics Processing Unit, GPU) 6041 and a microphone 6042. The graphics processing unit 6041 processes image data of a still picture or video obtained by an image capture apparatus (such as a camera) in a video capture mode or an image capture mode. A processed image frame may be displayed on the display unit 606. The image frame processed by the graphics processing unit 6041 may be stored in the memory 609 (or another storage medium) or be sent by the radio frequency unit 601 or the network module 602. The microphone 6042 is capable of receiving sounds and processing such sounds into audio data. The processed audio data can be converted into a format that can be sent to a mobile communication base station through the radio frequency unit 601 in a telephone call mode, for outputting.

The terminal 600 further includes at least one sensor 605, for example, an optical sensor, a motion sensor, and another sensor. Specifically, the optical sensor includes an ambient light sensor and a proximity sensor. The ambient light sensor may adjust luminance of the display panel 6061 based on brightness of ambient light, and the proximity sensor may turn off the display panel 6061 and/or backlight when the terminal 600 moves close to an ear. As a type of motion sensor, an accelerometer sensor can detect magnitudes of accelerations in all directions (usually three axes), can detect a magnitude and a direction of gravity when the terminal is in a static state, and can be applied to posture recognition (such as screen switching between portrait and landscape, related games, and magnetometer posture calibration) of the terminal, functions related to vibration recognition (such as pedometer and tapping), and the like. The sensor 605 may also include a fingerprint sensor, a pressure sensor, an iris sensor, a molecular sensor, a gyroscope, a barometer, a hygrometer, a thermometer, an infrared sensor, and the like. Details are not described herein.

The display unit 606 is configured to display information input by the user or information provided to the user. The display unit 606 may include a display panel 6061, and the display panel 6061 may be configured in a form of a liquid crystal display (Liquid Crystal Display, LCD), an organic light-emitting diode (Organic Light-Emitting Diode, OLED), or the like.

The user input unit 607 may be configured to receive input digit or character information and generate key signal input related to user setting and function control of the terminal. Specifically, the user input unit 607 includes a touch panel 6071 and other input devices 6072. The touch panel 6071 is also referred to as a touchscreen and can collect a touch operation (such as an operation performed by the user on the touch panel 6071 or near the touch panel 6071 with a finger or by using any proper object or accessory such as a stylus) of the user on or near the touch panel 6071. The touch panel 6071 may include two parts: a touch detection apparatus and a touch controller. The touch detection apparatus detects a touch azimuth of a user, detects a signal brought by a touch operation, and transmits the signal to the touch controller. The touch controller receives touch information from the touch detection apparatus, converts the touch information into touchpoint coordinates, and sends the touchpoint coordinates to the processor 610, and receives a command sent by the processor 610 and executes the command In addition, the touch panel 6071 may be implemented in a plurality of forms, for example, as a resistive, capacitive, infrared, or surface acoustic wave touch panel. The user input unit 607 may further include the other input devices 6072 in addition to the touch panel 6071. Specifically, the other input devices 6072 may include but are not limited to a physical keyboard, a function key (such as a volume control key or a switch key), a trackball, a mouse, and a joystick. Details are not described herein.

Further, the touch panel 6071 may cover the display panel 6061. When detecting a touch operation on or near the touch panel 6071, the touch panel 6071 transmits the touch operation to the processor 610 to determine a type of a touch event. Then, the processor 610 provides a corresponding visual output on the display panel 6061 based on the type of the touch event. Although in FIG. 6, the touch panel 6071 and the display panel 6061 act as two independent parts to implement input and output functions of the terminal, in some embodiments, the touch panel 6071 and the display panel 6061 may be integrated to implement the input and output functions of the terminal. This is not specifically limited herein.

The interface unit 608 is an interface between an external apparatus and the terminal 600. For example, an external apparatus may include a wired or wireless headset port, an external power supply (or a battery charger) port, a wired or wireless data port, a memory port, a port for connecting an apparatus with an identification module, an audio input/output (I/O) port, a video I/O port, an earphone port, and the like. The interface unit 608 may be configured to receive an input (for example, data information or power) from an external apparatus and transmit the received input to one or more elements within the terminal 600, or may be configured to transmit data between the terminal 600 and the external apparatus.

The memory 609 may be configured to store software programs and various data. The memory 609 may primarily include a program storage area and a data storage area. The program storage area may store an operating system, an application (such as an audio play function and an image play function) required by at least one function, and the like. The data storage area may store data (such as audio data and a phone book) created based on use of the terminal. In addition, the memory 609 may include a high-speed random access memory, and may further include a non-volatile memory such as at least one disk storage device, a flash memory device, or another volatile solid-state storage device.

The processor 610 is a control center of the terminal, and is connected to all components of the terminal by using various interfaces and lines. By running or executing a software program and/or module that is stored in the memory 609 and calling data stored in the memory 609, the processor 610 executes various functions of the terminal and processes data, so as to perform overall monitoring on the terminal. The processor 610 may include one or more processing units. Optionally, the processor 610 may integrate an application processor and a modem processor. The application processor mainly processes the operating system, a user interface, the application program, and the like. The modem processor mainly processes wireless communication. It can be understood that the modem processor may alternatively be not integrated in the processor 610.

The terminal 600 may further include the power supply 611 (for example, a battery) supplying power to all components. Optionally, the power supply 611 may be logically connected to the processor 610 through a power management system. In this way, functions such as charge management, discharge management, and power consumption management are implemented by using the power management system.

In addition, the terminal 600 includes some functional modules that are not shown. Details are not described herein.

Optionally, an embodiment of this disclosure further provides a terminal, including a processor 610, a memory 609, and a computer program stored in the memory 609 and capable of running on the processor 610. When the computer program is executed by the processor 610, each process of the message transmission method provided in the embodiment shown in FIG. 2 or 3 is implemented, with the same technical effect achieved. To avoid repetition, details are not described herein again.

An embodiment of this disclosure further provides a computer-readable storage medium. The computer-readable storage medium stores a computer program, and when the computer program is executed by a processor, the message transmission method provided in the embodiment shown in FIG. 2 or 3 is implemented, with the same technical effect achieved. To avoid repetition, details are not described herein again. The computer-readable storage medium is, for example, a read-only memory (Read-Only Memory, ROM), a random access memory (Random Access Memory, RAM), a magnetic disk, or an optical disc.

It should be noted that in this specification, the term "comprise", "include", or any other variant thereof is intended to cover a non-exclusive inclusion, so that a process, a method, an article, or an apparatus that includes a list of elements not only includes those elements but also includes other elements that are not expressly listed, or further includes elements inherent to such process, method, article, or apparatus. In absence of more constraints, an element preceded by "includes a . . . " does not preclude existence of other identical elements in the process, method, article, or apparatus that includes the element.

According to the foregoing description of the implementations, a person skilled in the art may clearly understand that the methods in the foregoing embodiments may be implemented by using software in combination with a necessary common hardware platform, and certainly may alternatively be implemented by using hardware. However, in most cases, the former is a preferred implementation. Based on such an understanding, the technical solutions of this disclosure essentially, or the part contributing to the related art may be implemented in a form of a software product. The computer software product is stored in a storage medium (for example, a ROM/RAM, a magnetic disk, or an optical disc), and includes several instructions for instructing a terminal (which may be a mobile phone, a computer, a server, an air conditioner, a network device, or the like) to perform the method described in the embodiments of this disclosure.

The foregoing describes the embodiments of this disclosure with reference to the accompanying drawings. However, this disclosure is not limited to the foregoing specific implementations. The foregoing specific implementations are merely illustrative rather than restrictive. As instructed by this disclosure, a person of ordinary skill in the art may develop many other manners without departing from principles of this disclosure and the protection scope of the claims, and all such manners fall within the protection scope of this disclosure.

What is claimed is:

1. A message transmission method, applied to a terminal and comprising:
    transmitting a first discovery message in a sidelink (SL), wherein
    the first discovery message is transmitted between an upper layer and a MAC layer through a logical channel, and a priority of the first discovery message is determined based on the logical channel and/or a corresponding bearer;
    wherein in a case that the first discovery message is transmitted between the upper layer and the MAC layer through a control logical channel, the first discovery message is transmitted between the upper layer and the MAC layer through an signaling radio bearer (SRB); the first discovery message and a first message in the SL are transmitted through at least two different SRBs, the first message in the SL comprises RRC signaling in the SL and a PC5 signaling message in the SL, the first discovery message, the RRC signaling in the SL and the PC5 signaling message in the SL have a same priority.

2. The method according to claim 1, wherein in a case that the first discovery message is transmitted between the upper layer and the MAC layer through a control logical channel, the priority of the first discovery message is a priority of an SRB or the control logical channel that transmits the first discovery message; or
    in a case that the first discovery message is transmitted between the upper layer and the MAC layer through a data logical channel,
    the first discovery message is assigned a quality of service QoS parameter, the first discovery message is mapped to the corresponding data logical channel by the terminal based on the QoS parameter, and the priority of the first discovery message is a priority of a DRB or the data logical channel that transmits the first discovery message; or
    the first discovery message is assigned a logical channel identifier LCID, and the priority of the first discovery message is a priority of a logical channel corresponding to the LCID.

3. The method according to claim 1, wherein in a case that the first discovery message is transmitted between the upper layer and the MAC layer through a control logical channel, the priority of the first discovery message is determined based on the following:
    a first message in a UL has a first priority, a first message and the first discovery message in the SL have a second priority, a second message in the UL and a second message in the SL have a third priority, the first priority is higher than or equal to the second priority, and the second priority is higher than the third priority;
    or
    in a case that the first discovery message is transmitted between the upper layer and the MAC layer through a data logical channel, the priority of the first discovery message is determined based on the following:
    a first message in a UL has a first priority, a first message in the SL has a second priority, a second message in the UL and a second message and the first discovery message in the SL have a third priority, the first priority is higher than or equal to the second priority, and the second priority is higher than the third priority.

4. The method according to claim 3, wherein
    the second message in the SL comprises data in the SL
    the first discovery message is transmitted between the upper layer and the MAC layer through a data logical channel means that the first discovery message is transmitted between the upper layer and the MAC layer through a data radio bearer DRB.

5. The method according to claim 4, wherein the first discovery message is transmitted on a first SRB, the RRC signaling in the SL is transmitted on a second SRB, a third SRB used for the PC5 signaling message in the SL is configured by using RRC signaling in the SL, and if establishment of the third SRB is completed, the PC5 signaling message in the SL is transmitted on the third SRB.

6. The method according to claim 3, wherein a plurality of messages with the third priority are transmitted on a DRB;
   at least two of the plurality of messages with the third priority have different priorities; and
   when the plurality of messages with the third priority cannot be sent simultaneously, based on a priority order, messages with higher priorities are preferentially sent or some of the plurality of messages with the third priority are preferentially discarded.

7. The method according to claim 3, wherein the priority of the second message in the UL is different from the priority of the second message in the SL; and
   if a priority value of the second message in the UL is lower than a first threshold, the second message in the UL is preferential; if the priority value of the second message in the UL is not lower than the first threshold, and the priority value of the second message in the SL is lower than a second threshold, the second message in the SL is preferential; or if the priority value of the second message in the UL is not lower than the first threshold, and the priority value of the second message in the SL is not lower than the second threshold, the second message in the UL is preferential;
   or
   if the priority value of the second message in the SL is lower than a first threshold, the second message in the SL is preferential; if the priority value of the second message in the SL is not lower than the first threshold, and the priority value of the second message in the UL is lower than a second threshold, the second message in the UL is preferential; or if the priority value of the second message in the SL is not lower than the first threshold, and the priority value of the second message in the UL is not lower than the second threshold, the second message in the SL is preferential;
   or
   if the priority value of the second message in the SL is lower than a first threshold, and the priority value of the second message in the UL is not lower than a second threshold, the second message in the SL is preferential; or if the priority value of the second message in the SL is not lower than a first threshold, and the priority value of the second message in the UL is lower than a second threshold, the second message in the UL is preferential;
   or
   if the priority value of the second message in the SL is not lower than a first threshold, and the priority value of the second message in the UL is lower than a second threshold, the second message in the UL is preferential; or if the priority value of the second message in the SL is lower than a first threshold, and the priority value of the second message in the UL is not lower than a second threshold, the second message in the SL is preferential;
   or
   in a first case, the second message in the SL is preferential; in a second case, the second message in the UL is preferential; or in cases other than the first case and the second case, the priority of the second message in the SL and the priority of the second message in the UL are determined by the terminal, wherein the first case is: the priority value of the second message in the SL is lower than a first threshold, and the priority value of the second message in the UL is not lower than a second threshold; and the second case is: the priority value of the second message in the SL is not lower than the first threshold, and the priority value of the second message in the UL is lower than the second threshold.

8. The method according to claim 3, wherein in priorities of the first discovery message, a priority of sending the first discovery message is higher than a priority of receiving the first discovery message; and/or
   in priorities of the second message in the UL, a priority of sending the second message in the UL is higher than a priority of receiving the second message in the UL; and/or
   in priorities of the second message in the SL, a priority of sending the second message in the SL is higher than a priority of receiving the second message in the SL.

9. A terminal, comprising a memory, a processor, and a program stored in the memory and capable of running on the processor, wherein when the program is executed by the processor, implement:
   transmitting a first discovery message in a sidelink (SL), wherein
   the first discovery message is transmitted between an upper layer and a MAC layer through a logical channel, and a priority of the first discovery message is determined based on the logical channel and/or a corresponding bearer;
   wherein in a case that the first discovery message is transmitted between the upper layer and the MAC layer through a control logical channel, the first discovery message is transmitted between the upper layer and the MAC layer through an signaling radio bearer (SRB); and
   the first discovery message and a first message in the SL are transmitted through at least two different SRBs, the first message in the SL comprises RRC signaling in the SL and a PC5 signaling message in the SL, the first discovery message, the RRC signaling in the SL and the PC5 signaling message in the SL have a same priority.

10. The terminal according to claim 9, wherein in a case that the first discovery message is transmitted between the upper layer and the MAC layer through a control logical channel, the priority of the first discovery message is a priority of an SRB or the control logical channel that transmits the first discovery message.

11. The terminal according to claim 9, wherein in a case that the first discovery message is transmitted between the upper layer and the MAC layer through a control logical channel, the priority of the first discovery message is determined based on the following:
   a first message in a UL has a first priority, a first message and the first discovery message in the SL have a second priority, a second message in the UL and a second message in the SL have a third priority, the first priority is higher than or equal to the second priority, and the second priority is higher than the third priority.

12. The terminal according to claim 11, the second message in the SL comprises data in the SL.

* * * * *